US008340661B2

(12) United States Patent  (10) Patent No.: US 8,340,661 B2
Boixadera et al.  (45) Date of Patent: Dec. 25, 2012

(54) LOW-COST MULTIMODE GSM MONITORING FROM TD-SCDMA

(75) Inventors: Francesc Boixadera, Cambridge (GB); Eric K. Bolton, Kernersville, NC (US); Stuart Bennett, Bedfordshire (GB)

(73) Assignee: MStar Semiconductor, Inc. (TW)

( * ) Notice: Subject to any disclaimer, the term of this patent is extended or adjusted under 35 U.S.C. 154(b) by 280 days.

(21) Appl. No.: 12/829,821

(22) Filed: Jul. 2, 2010

(65) Prior Publication Data

US 2012/0003972 A1  Jan. 5, 2012

(51) Int. Cl.
H04W 88/06 (2009.01)
(52) U.S. Cl. .................. 455/426.1; 455/552.1
(58) Field of Classification Search ............ 455/426.1, 455/552.1; 370/331
See application file for complete search history.

(56) References Cited

U.S. PATENT DOCUMENTS

2010/0074218 A1*  3/2010  Cai et al. ................ 370/331

* cited by examiner

Primary Examiner — Sam Bhattacharya
(74) Attorney, Agent, or Firm — Andy M. Han; Han IP Law PLLC

(57) ABSTRACT

Embodiments of techniques for low-cost multimode operation in wireless communications involving the Time Division Synchronous Code Division Multiple Access (TD-SCDMA) standard and the Global System for Mobile telecommunications (GSM) standard are described. In one aspect, a method of multimode operation in a mobile telecommunication device renders wireless communications based on the TD-SCDMA standard using either or both of first and second frequency synthesizers of the mobile telecommunication device. The method also receives signals based on the GSM standard using either or both of the first and second frequency synthesizers of the mobile telecommunication device. Techniques for performing baton handover as well as signal reception for multimedia broadcast and multicast services (MBMS) using two frequency synthesizers are also provided.

21 Claims, 14 Drawing Sheets

LOW-COST MULTIMODE GSM MONITORING FROM TD-SCDMA

TECHNICAL FIELD

The present disclosure relates to mobile telecommunications and, more particularly, to multimode operation in mobile telecommunications involving the Time Division Synchronous Code Division Multiple Access (TD-SCDMA) standard and the Global System for Mobile telecommunications (GSM) standard.

BACKGROUND

With the advancement in technology, mobile telecommunications have evolved from the Advanced Mobile Phone System (AMPS) in the 1980's to the second generation (2G) in the 1990's, including those based on the GSM standard, and on to the third generation (3G) in the present day. One of the 3G standards is TD-SCDMA, which uses time-division duplexing (TDD). By dynamically adjusting the number of time slots used for downlink and uplink, a TD-SCDMA mobile telecommunication network can more easily accommodate asymmetric traffic with different data rate requirements on downlink and uplink than a network based on frequency-division duplexing (FDD).

In various markets, mobile telecommunication networks based on 3G standards are being deployed in place of or in addition to existing 2G networks. As such, multimode operation is a critical success factor as well as necessity for 3G networks. Without the capability of multimode operation, mobile handset users may lose coverage when entering areas where a 3G network has yet to be deployed. In markets where networks based on the TD-SCDMA standard are deployed, multimode operation in mobile handsets allow users to enjoy high-speed data applications with 3G TD-SCDMA coverage while having the assurance of GSM cellular coverage in areas where 3G TD-SCDMA coverage is not yet available.

For TD-SCDMA single-mode operation, a mobile handset needs two frequency synthesizers in the radio, typically with one frequency synthesizer designated for the transmission and receiving of TD-SCDMA signals and the other designated for the reception of TD-SCDMA signals from neighbor cells. The frequency synthesizers are typically in the form of phase-locked loops (PLL). However, in order to provide TD-SCDMA/GSM multimode operation, the mobile handset needs an additional frequency synthesizer for GSM monitoring because no suitable monitoring gaps for GSM have been defined that will guarantee the detection of GSM neighbor cells in all possible TD-SCDMA configurations for data transmission and neighbor cell monitoring. As a result, existing multimode handsets require two independent receiver paths and three frequency synthesizers.

In general, there are four types of activities in TD-SCDMA/GSM multimode operation. Firstly, there are TD-SCDMA data receiving activities during those time slots used for receiving. According to the TD-SCDMA standard, the time slots TS0 and TS6 may only be used for receiving. Secondly, there are TD-SCDMA signal reception activities that take place during the time slot TS0, such as inter-frequency monitoring for example. Thirdly, there are TD-SCDMA transmission activities during those time slots used for transmission. According to the TD-SCDMA standard, the time slot TS1 may only be configured for transmission, and time slots TS2 TS3 TS4 TS5 may be configured for transmitting or receiving. Fourthly, there are GSM receiving or monitoring activities to receive signals from neighbor cells. GSM monitoring should not overlap in time with TD-SCDMA transmission time slots because TD-SCDMA transmission tends to de-sense signal reception for GSM monitoring.

FIG. 1 illustrates a timing diagram of TD-SCDMA/GSM multimode operation using three frequency synthesizers, under a worst-case scenario in which High-Speed Uplink Packet Access (HSUPA) protocol category 5/6 2.2 Mbps uplink is occurring under a conventional scheme. A first frequency, frequency 1, is used for TD-SCDMA transmission and receiving activities. A second frequency, frequency 2, is used for TD-SCDMA signal reception, such as, for example, inter-frequency monitoring for signals from neighbor cells. A third frequency, frequency 3, is used for GSM monitoring for signals from neighbor cells.

Here, in the worst-case scenario with respect to GSM monitoring, the TD-SCDMA time slots UpPTS and TS1 through TS5 are all used for transmission on frequency 1. Time slot TS6 is used for signal reception on frequency 1. Time slot TS0 is used for signal reception on frequency 2, such as for TD-SCDMA inter-frequency monitoring for signals from neighbor cells. Throughout the entire time, or continuously, GSM monitoring for signals from neighbor cells is performed on frequency 3. As shown in FIG. 1, in the conventional scheme, two frequency synthesizers, or two PLLs, are required for activities based on the TD-SCDMA standard. Without a third PLL, either GSM monitoring or TD-SCDMA signal reception cannot be carried out. The third PLL is therefore required for TD-SCDMA/GSM multimode operation.

Moreover, in order to avoid de-sensing signal reception in the GSM mode due to TD-SCDMA transmission, GSM receiving (i.e., monitoring) and TD-SCDMA transmission cannot overlap in time. However, this is particularly challenging since in some configurations most of the time in a TD-SCDMA subframe is used for TD-SCDMA transmission, which leaves very little time available for GSM monitoring.

An existing solution to the aforementioned issues utilizes two separate radios in a given mobile handset, one for TD-SCDMA and the other for GSM. Still, as the integration level is low, such solution tends to be expensive, and three frequency synthesizers are required. Even if the two radios are combined, three frequency synthesizers are still required. This makes the design of an integrated-circuit multimode radio more complicated, risky to layout, and expensive. In any case, the need to avoid overlap between GSM receiving and TD-SCDMA transmission remains a difficult issue.

Additionally, in some TD-SCDMA inter-frequency baton handover scenarios there may be adjacent receiving and transmission time slots, resulting in change from transmission in one frequency to receiving in another frequency in zero time. When frequency synthesizers are shared, an issue arises as there is no time to re-lock a shared frequency synthesizer. Moreover, during multimedia broadcast and multicast services (MBMS), there is zero time to move from receiving in one frequency in TD-SCDMA time slot TS6 to receiving in another frequency in TD-SCDMA time slot TS0. As two separate frequency synthesizers are needed for this TD-SCDMA operation, this is an issue when the frequency synthesizers are shared.

SUMMARY

A technique of multimode operation in a mobile telecommunication device renders wireless communications based on the TD-SCDMA standard using either or both of first and second frequency synthesizers of the mobile telecommunication device. Signals based on the GSM standard are monitored using either or both of the first and second frequency synthesizers of the mobile telecommunication device.

In one aspect, the rendering wireless communications based on the TD-SCDMA standard using either or both of first and second frequency synthesizers may include: transmitting and receiving signals based on the TD-SCDMA standard on a first frequency using the first frequency synthesizer; and optionally receiving signals based on the TD-SCDMA standard on a second frequency using the first frequency synthesizer, the second frequency being optionally the same as or different from the first frequency. The monitoring for signals based on the GSM standard using either or both of the first and second frequency synthesizers may include monitoring for signals based on the GSM standard on a third frequency using the second frequency synthesizer, the third frequency being different from the first and second frequencies.

The transmission and reception of signals based on the TD-SCDMA standard on the first frequency using the first frequency synthesizer may include transmitting or receiving signals based on the TD-SCDMA standard on the first frequency using the first frequency synthesizer during one or more of the TD-SCDMA time slots UpPTS, TS1, TS2, TS3, TS4, TS5, and TS6. Additionally, optionally receiving signals based on the TD-SCDMA standard on the second frequency using the first frequency synthesizer may include optionally receiving signals based on the TD-SCDMA standard on the second frequency using the first frequency synthesizer during at least one TD-SCDMA time slot TS0. Moreover, the monitoring for signals based on the GSM standard on the third frequency using the second frequency synthesizer may include monitoring for signals based on the GSM standard on the third frequency using the second frequency synthesizer during one or more of the TD-SCDMA time slots TS6 and TS0.

The optionally receiving signals based on the TD-SCDMA standard on the second frequency using the first frequency synthesizer may start at a predetermined time after the onset of the individual TD-SCDMA time slots TS0.

Before a baton handover: signals based on the TD-SCDMA standard may be transmitted or received on the first frequency using the first frequency synthesizer during one or more of the TD-SCDMA time slots UpPTS, TS1, TS2, TS3, TS4, TS5, and TS6; signals based on the TD-SCDMA standard may be optionally monitored for on the second frequency using the first frequency synthesizer during at least one TD-SCDMA time slot TS0; and signals based on the GSM standard may be monitored for on the third frequency using the second frequency synthesizer. During the baton handover: signals based on the TD-SCDMA standard may be transmitted or received on a fourth frequency using the first frequency synthesizer during one or more of the TD-SCDMA time slots UpPTS, TS1, TS2, TS3, TS4, and TS5, the fourth frequency being different from the first, second, and third frequencies; signals based on the TD-SCDMA standard may be received on the first frequency using the second frequency synthesizer during the individual TD-SCDMA time slots TS6; the monitoring for signals based on the GSM standard on the third frequency may be suspended; and the receiving signals based on the TD-SCDMA standard on the second frequency during at least one TD-SCDMA time slot TS0 may be optionally continued. After the baton handover: signals based on the TD-SCDMA standard may be transmitted or received on the fourth frequency using the first frequency synthesizer during one or more of the TD-SCDMA time slots UpPTS, TS1, TS2, TS3, TS4, TS5, and TS6; signals based on the TD-SCDMA standard may be optionally monitored for on the second frequency using the first frequency synthesizer during at least one TD-SCDMA time slot TS0; and signals based on the GSM standard may be monitored for on the third frequency using the second frequency synthesizer.

In another aspect, the rendering wireless communications based on the TD-SCDMA standard using one or both of first and second frequency synthesizers may include: transmitting and receiving signals based on the TD-SCDMA standard on a first frequency using both of the first and second frequency synthesizers; and optionally receiving signals based on the TD-SCDMA standard on a second frequency using both of the first and second frequency synthesizers, the second frequency being optionally the same as or different from the first frequency. Additionally, the monitoring for signals based on the GSM standard using one or both of the first and second frequency synthesizers may include monitoring for signals based on the GSM standard on a third frequency using both of the first and second frequency synthesizers, the third frequency being different from the first and second frequencies.

More specifically, the monitoring for signals based on the GSM standard on the third frequency, transmitting and receiving signals based on the TD-SCDMA standard on the first frequency, and optionally receiving signals based on the TD-SCDMA standard on the second frequency using both of the first and second frequency synthesizers may include: using the first frequency synthesizer to receive signals based on the GSM standard on the third frequency, to transmit and receive signals based on the TD-SCDMA standard on the first frequency, and to receive signals from the neighbor cell based on the TD-SCDMA standard on the second frequency during a first time period that is repeated periodically; and using the second frequency synthesizer to receive signals based on the GSM standard on the third frequency, to transmit and receive signals based on the TD-SCDMA standard on the first frequency, and to optionally receive signals based on the TD-SCDMA standard on the second frequency during a second time period that is repeated periodically. Each repetition of the first time period and each repetition of the second time period overlap for at least an amount of time approximately equal to a sum of the TD-SCDMA time slots TS6, TS0, and downlink pilot time slot (DwPTS). Each of the first and second time periods respectively spans from the time slot TS6 of a TD-SCDMA subframe to at least the time slot DwPTS subsequent the time slot TS6 of an adjacent TD-SCDMA subframe.

During the first time period, the second frequency synthesizer may receive signals based on the GSM standard on the third frequency during at least the TD-SCDMA time slots TS6, TS0, and DwPTS. The first frequency synthesizer may transmit or receive signals based on the TD-SCDMA standard on the first frequency during one or more of the immediately subsequent TD-SCDMA time slots UpPTS, TS1, TS2, TS3, TS4, TS5, and TS6, and may optionally receive signals based on the TD-SCDMA standard on the first or second frequency during at least the immediately subsequent TD-SCDMA time slots TS0 and DwPTS. During the second time period, the first frequency synthesizer may receive signals based on the GSM standard on the third frequency during at least the TD-SCDMA time slots TS6, TS0, and DwPTS. The second frequency synthesizer may transmit or receive signals based on the TD-SCDMA standard on the first frequency during one or more of the immediately subsequent TD-SCDMA time slots UpPTS, TS1, TS2, TS3, TS4, TS5, and TS6, and may optionally receive signals based on the TD-SCDMA standard on the second frequency during at least the immediately subsequent TD-SCDMA time slots TS0 and DwPTS.

Before a baton handover: signals based on the TD-SCDMA standard may be transmitted or received on the first frequency using the first frequency synthesizer during one or more of the TD-SCDMA time slots UpPTS, TS1, TS2, TS3, TS4, TS5, and TS6; signals based on the TD-SCDMA standard may be optionally monitored for on the second frequency using the first frequency synthesizer during at least one TD-SCDMA time slot TS0; and signals based on the GSM standard may be monitored for on the third frequency using the second frequency synthesizer. During the baton handover: signals based on the TD-SCDMA standard may be received on the first frequency using the first frequency synthesizer during one or more of the TD-SCDMA time slots TS2, TS3, TS4, TS5, and TS6; signals based on the TD-SCDMA standard may be transmitted on a fourth frequency using the second frequency synthesizer during one or more of the TD-SCDMA time slots UpPTS, TS1, TS2, TS3, TS4, and TS5, the fourth frequency being different from the first, second, and third frequencies; the monitoring for signals based on the GSM standard on the third frequency may be suspended; and the receiving of signals based on the TD-SCDMA standard on the second frequency during at least one TD-SCDMA time slot TS0 may be optionally continued. After the baton handover: signals based on the TD-SCDMA standard may be transmitted or received on the fourth frequency using the second frequency synthesizer during one or more of the TD-SCDMA time slots UpPTS, TS1, TS2, TS3, TS4, TS5, and TS6; signals based on the TD-SCDMA standard may be optionally monitored for on the second frequency using the second frequency synthesizer during at least one TD-SCDMA time slot TS0; and signals based on the GSM standard may be monitored for on the third frequency using the first frequency synthesizer.

Broadcast channel (BCH) signals for multimedia broadcast and multicast services (MBMS) may be received on a first frequency during one of the TD-SCDMA time slots TS0 when the wireless communications based on the TD-SCDMA standard are rendered on a second frequency that is optionally the same as or different from the first frequency. The monitoring for signals based on the GSM standard on a third frequency during a period of time that is scheduled for the monitoring for signals based on the GSM standard may be suspended. The period of time at least partially coincides with the TD-SCDMA time slot TS0 during which the BCH signals are received for MBMS, the third frequency being different from the first and second frequencies.

Another technique of multimode operation in a mobile telecommunication device renders wireless communication based on the TD-SCDMA standard; periodically monitors for an initial base station identity code (BSIC) identification based on the GSM standard during a first time period that is repeated in a first pattern and overlaps one or more TD-SCDMA time slots; and periodically monitors for received signal strength indicator (RSSI) measurements, BSIC re-confirmation, or both based on the GSM standard during a second time period that is repeated in a second pattern and overlaps one or more TD-SCDMA time slots. The first and the second patterns are interleaved over time such that the monitoring for the initial BSIC identification, the monitoring for the RSSI measurements, and the monitoring for the BSIC re-confirmation alternatively overlap consecutive TD-SCDMA subframes.

Each of the first time period and the second time period may be at least approximately 1.42 msec in length and may be repeated once every two TD-SCDMA subframes to correspond approximately in time with TD-SCDMA time slots TS6, TS0, and DwPTS with respect to the wireless communication based on the TD-SCDMA standard.

The periodically monitoring for RSSI measurements, BSIC re-confirmation, or both based on the GSM standard during a second time period that is repeated in a second pattern and overlaps in time with one or more TD-SCDMA time slots may include monitoring for both the RSSI measurements and the BSIC re-confirmation during each repetition of the second time period.

The periodically monitoring for RSSI measurements and BSIC re-confirmation based on the GSM standard during a second time period that is repeated in a second pattern and overlaps in time with one or more TD-SCDMA time slots may include alternatively monitoring for the RSSI measurements and the BSIC re-confirmation such that either the monitoring for the RSSI measurements or the monitoring for the BSIC re-confirmation, but not both, is performed during each repetition of the second time period.

The wireless communication based on the TD-SCDMA standard may be rendered using either or both of first and second frequency synthesizers of the mobile telecommunication device. The initial BSIC identification, the RSSI measurements, and the BSIC re-conformation may be periodically monitored using either or both of the first and the second frequency synthesizers of the mobile telecommunication device.

Additionally, monitoring for either or both of RSSI measurements and BSIC re-confirmation based on the GSM standard or an idle time may occur during a third time period that is repeated in a third pattern and overlaps one or more TD-SCDMA time slots. The first, the second, and the third patterns may then be interleaved over time. Each of the first time period, the second time period, and the third time period may be at least approximately 1.42 msec in length and may be repeated once every three TD-SCDMA subframes to correspond in time with TD-SCDMA time slots TS6, TS0, and DwPTS with respect to the wireless communication based on the TD-SCDMA standard.

A radio circuit capable of multimode operation in a mobile telecommunication device may include a first frequency synthesizer, a second frequency synthesizer, a signal processing circuit, and a controller coupled to the first and second frequency synthesizers and the signal processing circuit. The controller controls operations of the first and second frequency synthesizers and the signal processing circuit to render wireless communications based on the TD-SCDMA standard using either or both of the first and second frequency synthesizers, and to receive signals based on the GSM standard using either or both of the first and second frequency synthesizers.

The controller may control the first and second frequency synthesizers and the signal processing circuit to: transmit or receive signals based on the TD-SCDMA standard on a first frequency using the first frequency synthesizer during one or more of the TD-SCDMA time slots UpPTS, TS1, TS2, TS3, TS4, TS5, or TS6; optionally receive signals based on the TD-SCDMA standard on a second frequency using the first frequency synthesizer during one or more of the TD-SCDMA time slots TS0 and DwPTS, the second frequency being optionally the same as or different from the first frequency; and receive signals based on the GSM standard on a third frequency using the second frequency synthesizer during one or more of the TD-SCDMA time slots TS6 and TS0, the third frequency being optionally different from the first and second frequencies.

The controller may control the first and second frequency synthesizers and the signal processing circuit to: during a first time period that is repeated periodically, using the second frequency synthesizer, receive signals based on the GSM standard on the third frequency during at least the TD-SCDMA time slots TS6, TS0, and DwPTS, and, using the first frequency synthesizer, transmit or receive signals based on the TD-SCDMA standard on the first frequency during one or more of the immediately subsequent TD-SCDMA time slots UpPTS, TS1, TS2, TS3, TS4, TS5, and TS6, and optionally receive signals based on the TD-SCDMA standard on the second frequency during at least the immediately subsequent TD-SCDMA time slots TS0 and DwPTS; and during a second time period that is repeated periodically, using the first frequency synthesizer, receive signals based on the GSM standard on the third frequency during at least the TD-SCDMA time slots TS6, TS0, and DwPTS, and, using the second frequency synthesizer, transmit or receive signals based on the TD-SCDMA standard on the first frequency during one or more of the immediately subsequent TD-SCDMA time slots UpPTS, TS1, TS2, TS3, TS4, TS5, and TS6, and optionally receive signals based on the TD-SCDMA standard on the second frequency during at least the immediately subsequent TD-SCDMA time slots TS0 and DwPTS. Each repetition of the first time period and each repetition of the second time period may approximately overlap for at least an amount of time equal to a sum of the TD-SCDMA time slots TS6, TS0, and DwPTS. Each of the first and second time periods may respectively span from the time slot TS6 of a TD-SCDMA subframe to at least the time slot DwPTS subsequent the time slot TS6 of an adjacent TD-SCDMA subframe.

Before a baton handover, the controller may control the first and second frequency synthesizers and the signal processing circuit to: transmit or receive signals based on the TD-SCDMA standard on a first frequency during one or more of the TD-SCDMA time slots UpPTS, TS1, TS2, TS3, TS4, TS5, and TS6; optionally receive signals based on the TD-SCDMA standard on a second frequency during at least one TD-SCDMA time slot TS0, the second frequency being optionally the same as or different from the first frequency; and receive signals based on the GSM standard on a third frequency, the third frequency being different from the first and second frequencies.

During the baton handover, the controller may control the first and second frequency synthesizers and the signal processing circuit to: transmit or receive signals based on the TD-SCDMA standard on a fourth frequency during one or more of the TD-SCDMA time slots UpPTS, TS1, TS2, TS3, TS4, and TS5, the fourth frequency being different from the first, second, and third frequencies; transmit or receive signals based on the TD-SCDMA standard on the first frequency during individual TD-SCDMA time slots TS6; suspend the monitoring for signals based on the GSM standard on the third frequency; and optionally continue the receiving signals based on the TD-SCDMA standard on the second frequency during at least one TD-SCDMA time slot TS0.

The controller may control the first and second frequency synthesizers and the signal processing circuit to: receive BCH signals for MBMS on a first frequency during one of the TD-SCDMA time slots TS0 when the wireless communications based on the TD-SCDMA standard are rendered on a second frequency that is optionally the same as or different from the first frequency; and suspend monitoring for signals based on the GSM standard on a third frequency during a period of time that is scheduled for the monitoring for signals based on the GSM standard, the period of time at least partially coinciding with the TD-SCDMA time slot TS0 during which the BCH signals are received for MBMS, the third frequency being different from the first and second frequencies.

The above summary is provided to introduce concepts relating to multimode operation in a wireless communication device. These techniques are further described below in the detailed description. This summary is not intended to identify essential features of the claimed subject matter, nor is it intended for use in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
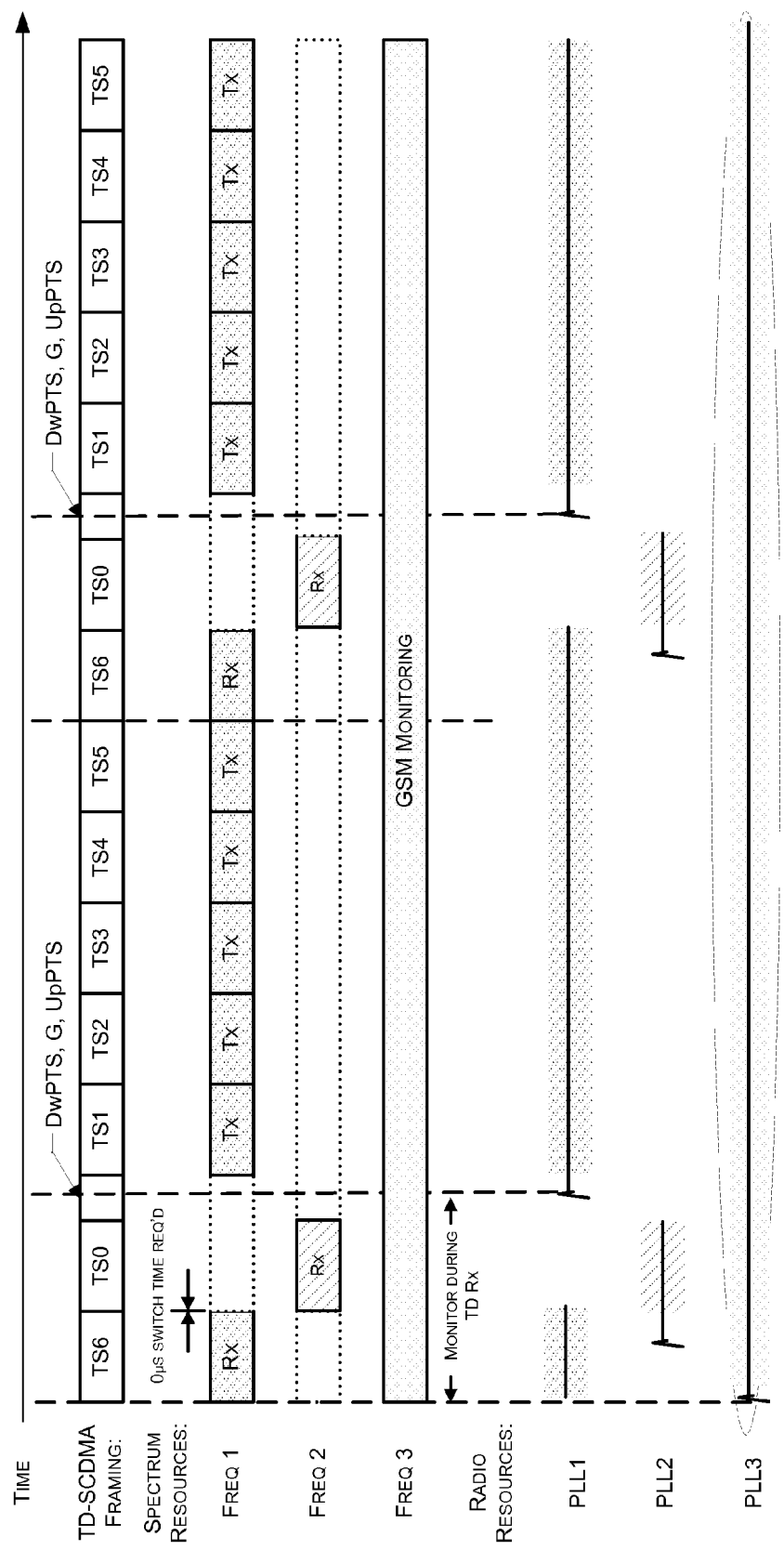
FIG. 1 illustrates a timing diagram of TD-SCDMA/GSM multimode operation using three frequency synthesizers under a conventional scheme.

The present disclosure describes techniques for low-cost multimode operation in mobile telecommunications involving the TD-SCDMA standard and the GSM standard. By implementing the inventive schemes described herein, TD-SCDMA/GSM multimode operation is achievable with two frequency synthesizers as opposed to three under conventional schemes. The disclosed inventive GSM monitoring pattern is independent of synthesizer allocation and may be used with the proposed two-synthesizer schemes as well as conventional three-synthesizer schemes. The disclosed inventive synthesizer allocation schemes allow not only TD-SCDMA/GSM multimode operation with two frequency synthesizers, but also address the aforementioned issues related to the worst-case scenario of HSUPA category 5/6 2.2 Mbps uplink, baton handover using two frequency synthesizers, and MBMS using two frequency synthesizers.

While aspects of described techniques relating to TD-SCDMA/GSM multimode operation using two frequency synthesizers can be implemented in any number of different forms of mobile telecommunication devices, environments, and/or configurations, embodiments are described in context of the following exemplary scheme(s).

According to the TD-SCDMA standard, each of the time slots in a subframe may or may not have designated purpose. Time slots TS1 through TS6 may not always be in use and any subset of these time slots may be configured for use. In a TD-SCDMA subframe, there is at least one uplink slot and at least one downlink slot, and all uplink slots start in TS1 and precede all downlink slots apart from TS0. When in use, time slot TS1 is generally for signal transmission (uplink) and time slot TS6 is generally for signal reception (downlink). The uplink pilot time slot UpPTS may be configured for signal transmission, and may be used for uplink initial synchronization, random access, and measurement for adjacent cell during handoff. There is one signal reception-to-transmission transition after time slot TS0 (and downlink pilot time slot DwPTS), and before time slot UpPTS and time slot TS1. Time slots TS2 through TS5 can be configured for either signal transmission or reception, but there is only one possible switching point between transmission and reception. Time slots TS0 and DwPTS may be configured on the same frequency as time slots TS1 through TS6, or on a different frequency. Time slots TS1 through TS6 are not always in use, and any subset of TS1 through TS6 may be configured for use.

The switching point can be configured in multiple ways as follows: (1) between time slots TS1 and TS2, resulting in signal reception during time slots TS0, DwPTS, TS2, TS3, TS4, TS5 and TS6 and signal transmission during time slots UpPTS and TS1; (2) between time slots TS2 and TS3, resulting in signal reception during time slots TS0, DwPTS, TS3, TS4, TS5 and TS6 and signal transmission during time slots UpPTS, TS1 and TS2; (3) between time slots TS3 and TS4, resulting in signal reception during time slots TS0, DwPTS, TS4, TS5 and TS6 and signal transmission during time slots UpPTS, TS1, TS2 and TS3; (4) between time slots TS4 and TS5, resulting in signal reception during time slots TS0, DwPTS, TS5 and TS6 and signal transmission during time slots UpPTS, TS1, TS2, TS3 and TS4; and (5) between time slots TS5 and TS6, resulting in signal reception during time slots TS0, DwPTS and TS6 and signal transmission during time slots UpPTS, TS1, TS2, TS3, TS4 and TS5.

While time slot TS0 is used for signal reception, a variety of signal receiving activities can take place during TS0. These activities include, for example, inter-frequency monitoring, intra-frequency monitoring, broadcast channel reception (BCH Rx), secondary common control physical channel reception (S-CCPCH Rx), and paging indication channel reception (PICH Rx). Additionally, signal reception during time slot TS0 can take place on two types of frequencies: serving cell primary carrier frequency and neighbor cell primary carrier frequency (the latter also known as inter-frequency monitoring). At any point in time, there is only one primary serving cell frequency, and either or both of intra-frequency monitoring (cell search and measurements) and data reception on any of the physical channels on the serving cell are performed. When on the neighbor cell primary carrier frequency, only inter-frequency monitoring is performed (cell search and measurements). Although multiple inter-frequency carriers can be monitored by the user equipment, only one at a time is monitored over the TS0/DwPTS period.

Accordingly, although the following exemplary embodiments are directed to a worst-case scenario with one particularly difficult HSUPA peak uplink data rate configuration in which time slots UpPTS and TS1 through TS5 are all used for signal transmission, one ordinarily skilled in the art would appreciate each TD-SCDMA subframe may have alternative signal receiving and transmitting activities under other operating conditions. Therefore, the scope of the present disclosure is not limited to the scenario described herewith and depicted in the Figures.

Illustrative Three-Synthesizer Multimode Operation

Figure 2:
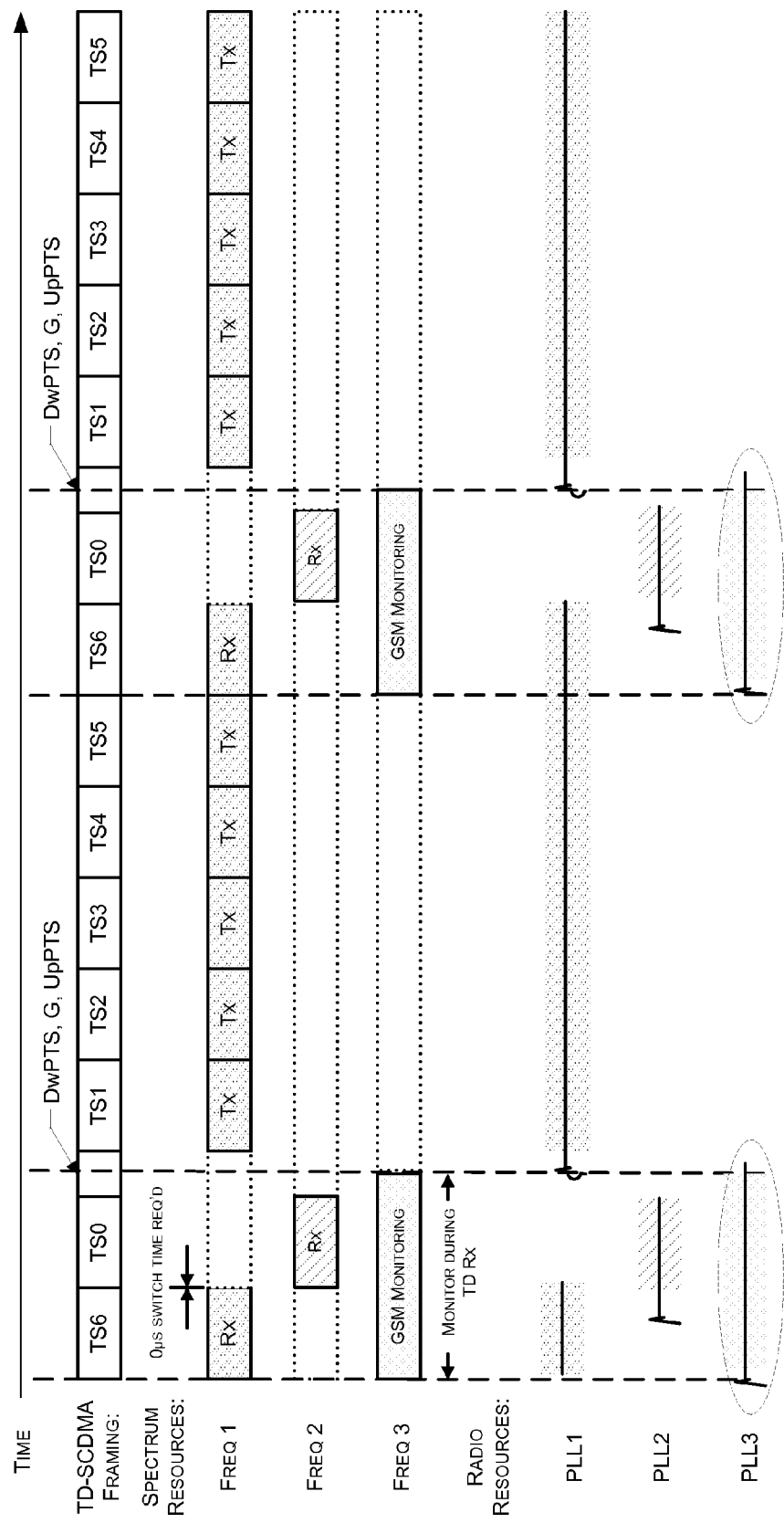
FIG. 2 illustrates a timing diagram of TD-SCDMA/GSM multimode operation using three frequency synthesizers with a GSM pattern in accordance with one illustrative non-limiting embodiment of the present disclosure.

FIG. 2 illustrates a timing diagram of TD-SCDMA/GSM multimode operation using three frequency synthesizers with a GSM pattern in accordance with the present disclosure.

As with FIG. 1, FIG. 2 shows a worst-case scenario in which HSUPA category 5/6 2.2 Mbps uplink is occurring. That is, the TD-SCDMA time slots UpPTS and TS1 through TS5 are all used for transmission on frequency 1 while time slot TS6 is used for signal reception on frequency 1. Time slot TS0 is used for TD-SCDMA signal reception, such as inter-frequency monitoring for signals from neighbor cells for example, on frequency 2. However, rather than monitoring for GSM measurement signals throughout the whole time, GSM monitoring for signals from neighbor cells is performed periodically on frequency 3.

In one embodiment, GSM monitoring is performed once every 5 msec, a periodicity that corresponds to the length of a TD-SCDMA subframe. Under such scheme, GSM monitoring is performed during one or more of the TD-SCDMA time slots TS6, TS0, and DwPTS. The TD-SCDMA time slot TS0 is designated for signal receiving according to the standard. With the time slot TS6 also only used for receiving, performing GSM monitoring during the time slots TS6, TS0, and DwPTS, a time interval when there is no TD-SCDMA transmission, allows the goal of avoiding the de-sensing of GSM monitoring to be achieved. Further, there needs to be a gap between the end of GSM monitoring on frequency 3 and the onset of TD-SCDMA transmission on frequency 1 at the beginning of TD-SCDMA time slots UpPTS and/or TS1, as shown in FIG. 2.

Accordingly, GSM monitoring need not be carried out throughout the whole time as in the case of the conventional scheme shown in FIG. 1. The proposed GSM monitoring pattern avoids de-sensing of GSM monitoring due to overlap in time between GSM monitoring and TD-SCDMA transmission. Besides, power consumption is reduced as GSM monitoring is only performed periodically.

However, despite the inventive GSM monitoring pattern of FIG. 2, two frequency synthesizers are required for activities based on the TD-SCDMA standard alone, and a third frequency synthesizer is still required for GSM monitoring. Without the third frequency synthesizer, either GSM monitoring or TD-SCDMA signal reception cannot be carried out to render a successful TD-SCDMA/GSM multimode operation for all possible TD-SCDMA configurations, including but not restricted to HSDPA (High-Speed Downlink Packet Access) and HSUPA (High-Speed Uplink Packet Access).

Illustrative First Embodiment of Two-Synthesizer Multimode Operation

Figure 3:
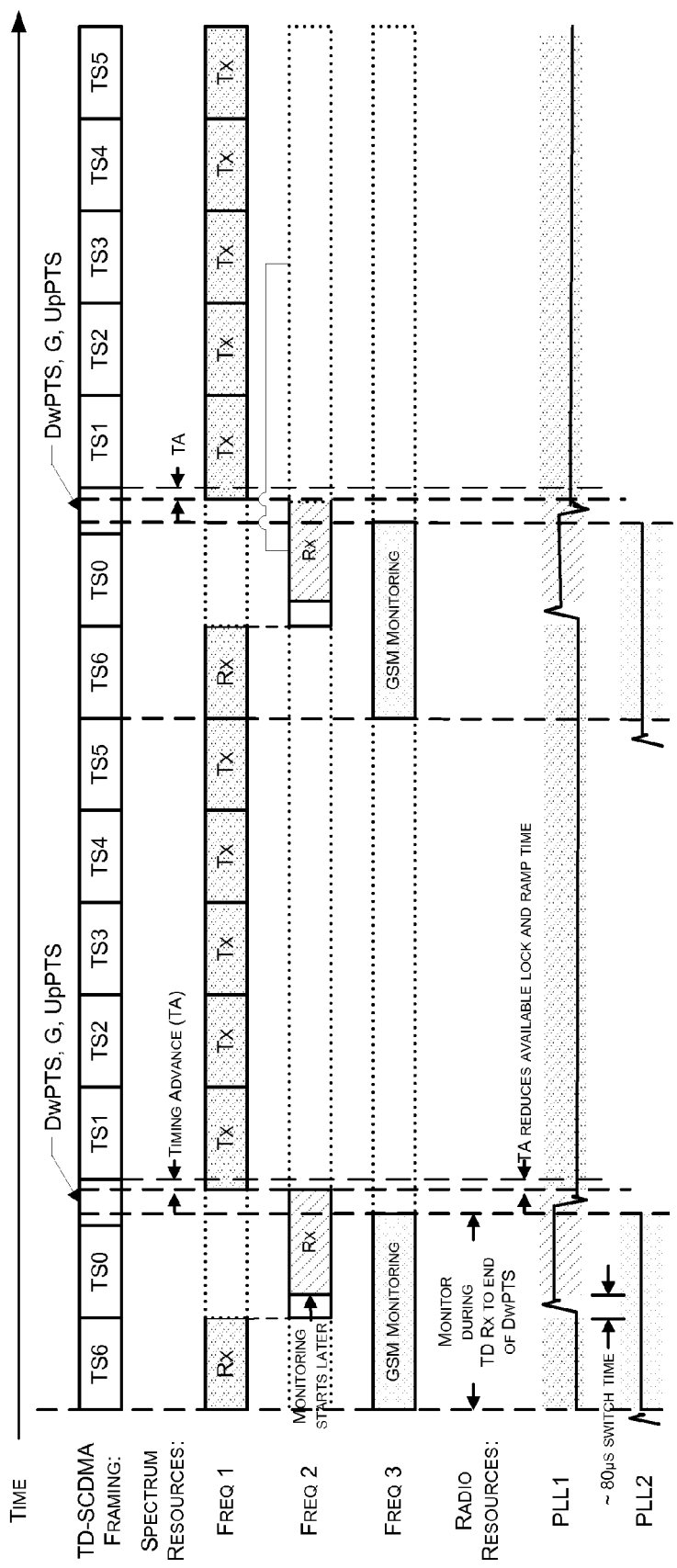
FIG. 3 illustrates a timing diagram of TD-SCDMA/GSM multimode operation using two frequency synthesizers in accordance with one illustrative non-limiting embodiment of the present disclosure.

FIG. 3 illustrates a timing diagram of TD-SCDMA/GSM multimode operation using two frequency synthesizers in accordance with one embodiment of the present disclosure.

As shown in FIG. 3, only two frequency synthesizers are required, instead of three, for TD-SCDMA/GSM multimode operation. In the illustrated embodiment, one of the frequency synthesizers, labeled as PLL1, is used for all TD-SCDMA activities while the other, labeled as PLL2, is used for GSM monitoring. In the example worst-case scenario in which HSUPA category 5/6 2.2 Mbps uplink is occurring, the TD-SCDMA time slots UpPTS and TS1 through TS5 are all used for transmission on frequency 1, using PLL1, while time slot TS6 is used for signal reception on frequency 1, using PLL1. Time slot TS0 is used for TD-SCDMA signal reception, such as inter-frequency monitoring for signals from neighbor cells for example, on frequency 2, also using PLL1. GSM monitoring for measurement signals from neighbor cells is performed periodically on frequency 3, using PLL2.

To allow the re-use of PLL1 for TD-SCDMA neighbor cell monitoring, the start of neighbor cell monitoring during the time slot TS0 is delayed slightly by a predetermined time, in the order of 30 to 80 μsec for example, for PLL relocking, or PLL retuning. The delay for PLL relocking is necessary because the TD-SCDMA transmission and receiving in other time slots are carried out on frequency 1 while the TD-SCDMA neighbor cell monitoring is carried out on frequency 2.

Meanwhile, GSM monitoring is performed using PLL2 periodically during a time period that approximately overlaps with the TD-SCDMA time slots TS6, TS0, and DwPTS. The combined length of the TD-SCDMA time slots TS6, TS0, and DwPTS is approximately 1.42 msec, and is sufficient for GSM monitoring. In other words, GSM monitoring is performed periodically in a pattern that repeats every 5 msec, which is the length of a TD-SCDMA subframe.

Under this scheme, PLL1 is continuously in use for TD-SCDMA activities and PLL2 is periodically in use for GSM monitoring. As shown in FIG. 3, depending on how long the GSM monitoring takes, the overlap in time between the time PLL 1 is in use and the time PLL2 is in use is approximately at least the sum of the lengths of the time slots TS6, TS0, and DwPTS.

Thus, according to the proposed inventive scheme, TD-SCDMA/GSM multimode operation for wireless communications is achievable with only two frequency synthesizers, even in the worst-case scenario.

Illustrative Second Embodiment of Two-Synthesizer Multimode Operation

Figure 4:
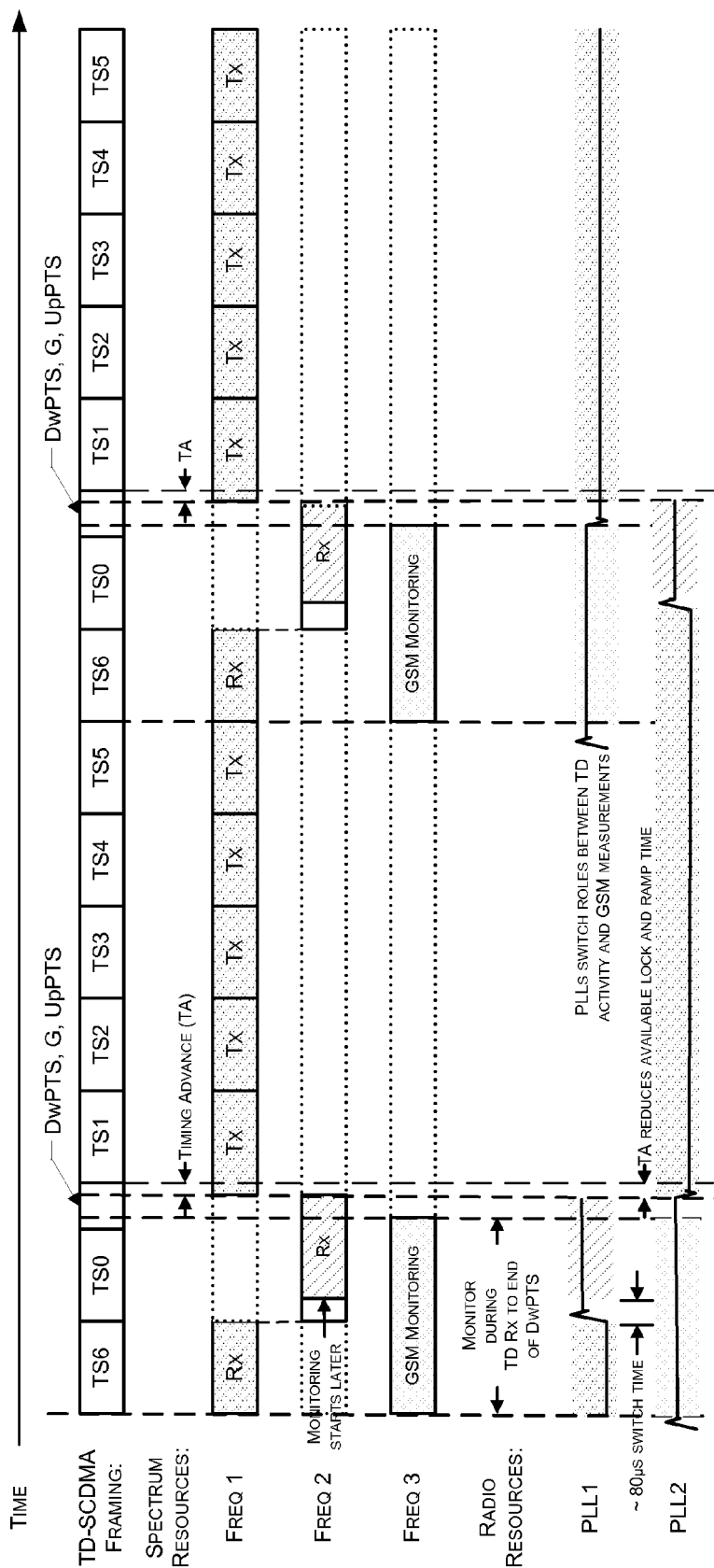
FIG. 4 illustrates a timing diagram of TD-SCDMA/GSM multimode operation using two frequency synthesizers in accordance with another illustrative non-limiting embodiment of the present disclosure.

FIG. 4 illustrates a timing diagram of TD-SCDMA/GSM multimode operation using two frequency synthesizers in accordance with another embodiment of the present disclosure.

As with FIG. 3, FIG. 4 shows the example worst-case scenario in which HSUPA category 5/6 2.2 Mbps uplink is occurring. The TD-SCDMA time slots UpPTS and TS1 through TS5 are all used for transmission on frequency 1 while time slot TS6 is used for signal reception on frequency 1. Time slot TS0 is used for TD-SCDMA signal reception, such as inter-frequency monitoring for signals from neighbor cells for example, on frequency 2. GSM monitoring for measurement signals from neighbor cells is performed periodically on frequency 3.

As shown in FIG. 4, only two frequency synthesizers are required, instead of three, for TD-SCDMA/GSM multimode operation. In the illustrated embodiment, both of the frequency synthesizers, labeled as PLL1 and PLL2, are used for the TD-SCDMA activities as well as for GSM monitoring. That is, PLL1 and PLL2 are alternatively used for the TD-SCDMA and GSM activities.

As previously described, the start of neighbor cell monitoring during the time slot TS0 is delayed slightly by a predetermined time, in the order of 30 to 80 μsec for example, for PLL relocking to allow the re-use of each of PLL1 and PLL2 for TD-SCDMA neighbor cell monitoring. This is necessary because the TD-SCDMA transmission and receiving in other time slots are carried out on frequency 1 while the TD-SCDMA neighbor cell monitoring is carried out on frequency 2.

GSM monitoring is performed periodically during a time period that approximately overlaps with the TD-SCDMA time slots TS6, TS0, and DwPTS.

The combined length of the TD-SCDMA time slots TS6, TS0, and DwPTS is approximately 1.42, and is sufficient for GSM monitoring. In other words, GSM monitoring is performed periodically in a pattern that repeats every 5 msec, which is the length of a TD-SCDMA subframe.

Under this scheme, when each of PLL1 and PLL2 is in use, it first starts with GSM monitoring during the time slots TS6, TS0, and DwPTS, and performs TD-SCDMA transmission and/or receiving during the time slots UpPTS, TS1, TS2, TS3, TS4, TS5, and TS6, followed by a delay for the predetermined time for PLL re-locking, and then optionally performs TD-SCDMA signal reception during the subsequent time slot TS0. As shown in FIG. 4, depending on how long the TD-SCDMA signal reception takes, the overlap in time between the time PLL 1 is in use and the time PLL2 is in use is approximately at least the sum of the lengths of the time slots TS6, TS0, and DwPTS.

Again, according to the proposed inventive scheme, TD-SCDMA/GSM multimode operation for wireless communications is achievable with only two frequency synthesizers, even in the worst-case scenario.

Baton Handover

Figure 5:
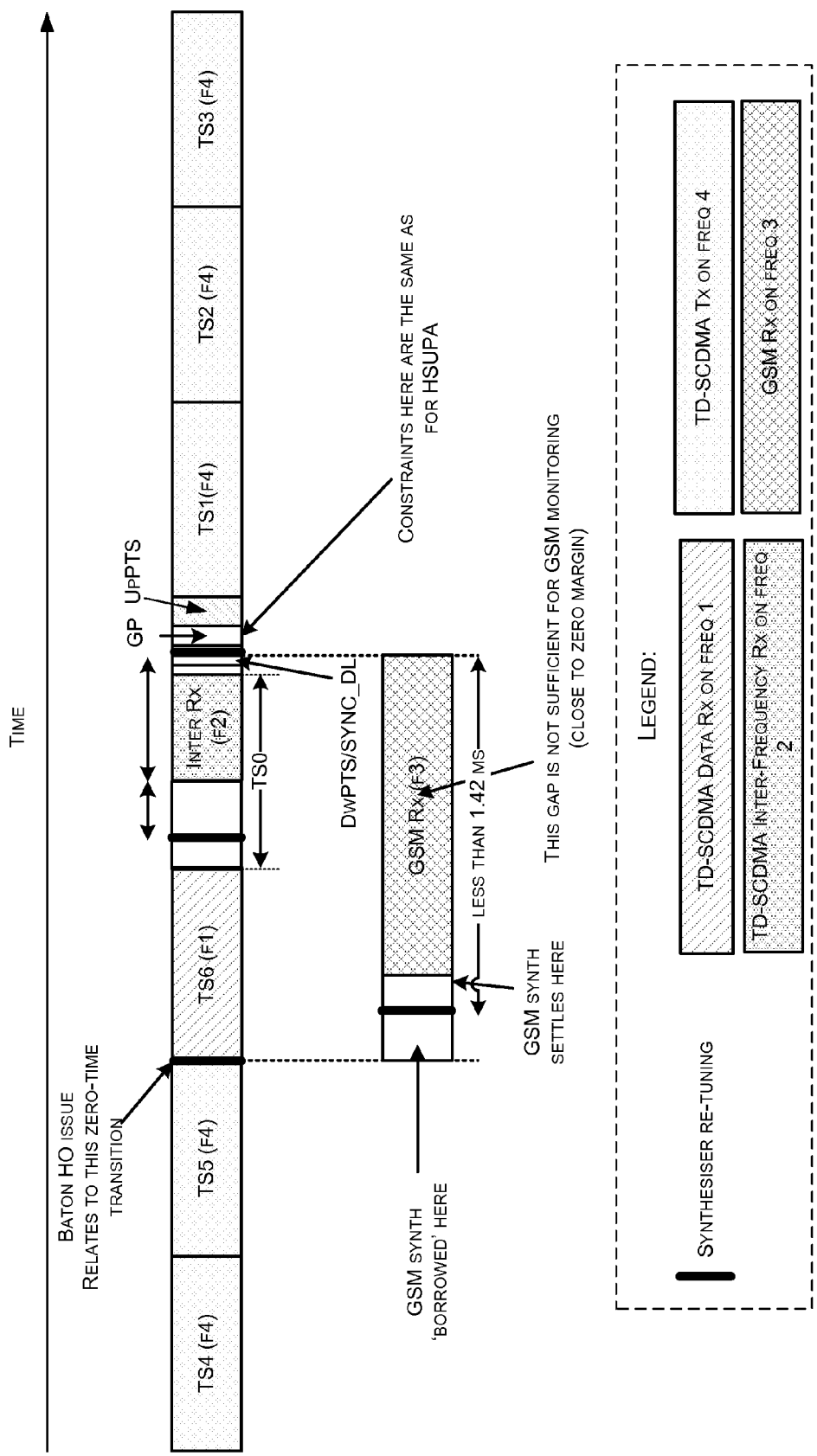
FIG. 5 illustrates a timing diagram of TD-SCDMA/GSM multimode operation during baton handover with two frequency synthesizers when both frequency synthesizers are used for TD-SCDMA operation.

FIG. 5 illustrates a timing diagram of TD-SCDMA/GSM multimode operation during baton handover with two frequency synthesizers when both frequency synthesizers are used for TD-SCDMA operation.

In wireless communications, handover refers to the process of transferring an ongoing call or data session from one channel (i.e., frequency) connected to the core network to another channel, such as when a user roams from a source cell to a target cell for example. In a baton handover, the channel in the source cell is retained and used for a while in parallel with the channel in the target cell. The connection to the target cell is established before the connection to the source cell is broken. The period of time during which the two connections are used in parallel may vary.

FIG. 5 shows a baton handover scenario when two frequency synthesizers are utilized for TD-SCDMA/GSM multimode operation. In the illustrated scenario, TD-SCDMA transmission on a new frequency, frequency 4, occurs during the time slots UpPTS, TS1, TS2, TS3, TS4, and TS5, TD-SCDMA signal reception on frequency 1 occurs during the time slot TS6, and TD-SCDMA signal reception on frequency 2 occurs during the time slot TS0, while GSM monitoring on frequency 3 occurs during a period of time that approximately overlaps with the time slots TS6, TS0, and DwPTS. An issue arises in that adjacent time slots may be used for transmission and receiving on different frequencies, as in the worst-case scenario of TD-SCDMA transmission on frequency 4 during the time slot TS5 and TD-SCDMA receiving on frequency 1 during the time slot TS6. This leaves no time for relocking, or retuning, a shared frequency synthesizer, and is troublesome as the data received during the time slot TS6 may likely be corrupted.

Illustrative First Embodiment of Two-Synthesizer Baton Handover

Figure 6:
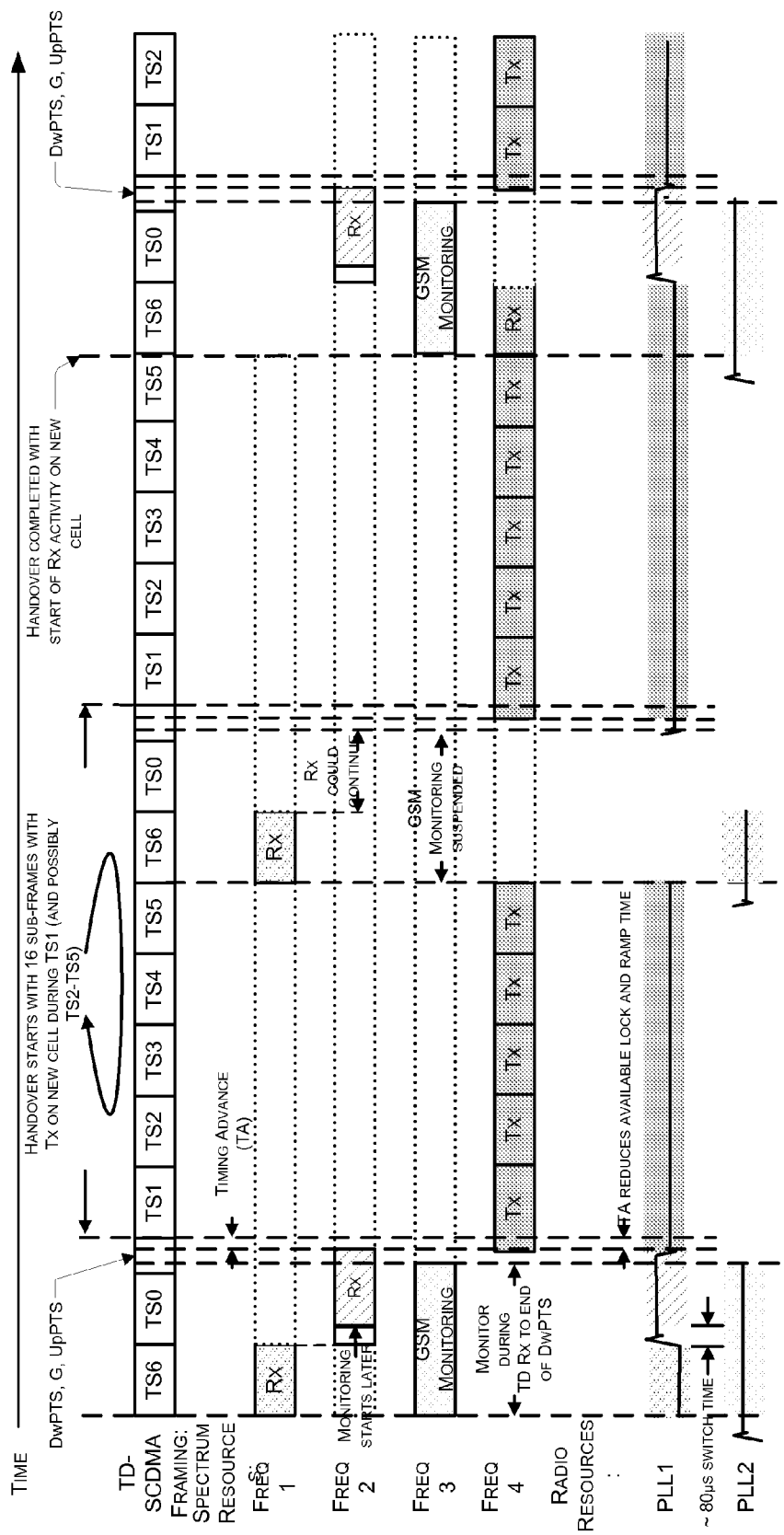
FIG. 6 illustrates a timing diagram of TD-SCDMA/GSM multimode operation during of baton handover using two frequency synthesizers in accordance with one illustrative non-limiting embodiment of the present disclosure.

FIG. 6 illustrates a timing diagram of TD-SCDMA/GSM multimode operation during of baton handover using two frequency synthesizers in accordance with one embodiment of the present disclosure.

Under a two-synthesizer multimode operation scheme such as that illustrated in FIG. 3, one of the frequency synthesizers, labeled as PLL1, is used for all TD-SCDMA activities while the other, labeled as PLL2, is used for GSM monitoring. Thus, before a baton handover, TD-SCDMA transmission and receiving activities on frequency 1 are performed using PLL1 during the time slots UpPTS, TS1, TS2, TS3, TS4, TS5, and TS6. TD-SCDMA signal reception on frequency 2 is optionally performed also using PLL1 during at least the time slots TS0 and DwPTS. GSM monitoring on frequency 3 is performed using PLL2 during at least the time slots TS6, TS0, and DwPTS.

According to the proposed inventive scheme, the frequency synthesizer used for GSM monitoring, PLL2 in the example, is borrowed for baton handover during the operation of baton handover. This is because baton handover typically lasts about 80 msec, and suspending GSM monitoring for a brief 80-msec period is acceptable.

As shown in FIG. 6, during the baton handover, GSM monitoring is suspended. TD-SCDMA transmission and receiving activities on frequency 4 are performed using PLL1 during the time slots UpPTS, TS1, TS2, TS3, TS4, and TS5. On the other hand, TD-SCDMA signal reception on frequency 1, during the time slot TS6, is performed using PLL2. TD-SCDMA signal reception for signals from neighbor cells on frequency 2, during the time slot TS0, may be optionally suspended or performed.

Illustrative Second Embodiment of Two-Synthesizer Baton Handover

Figure 7:
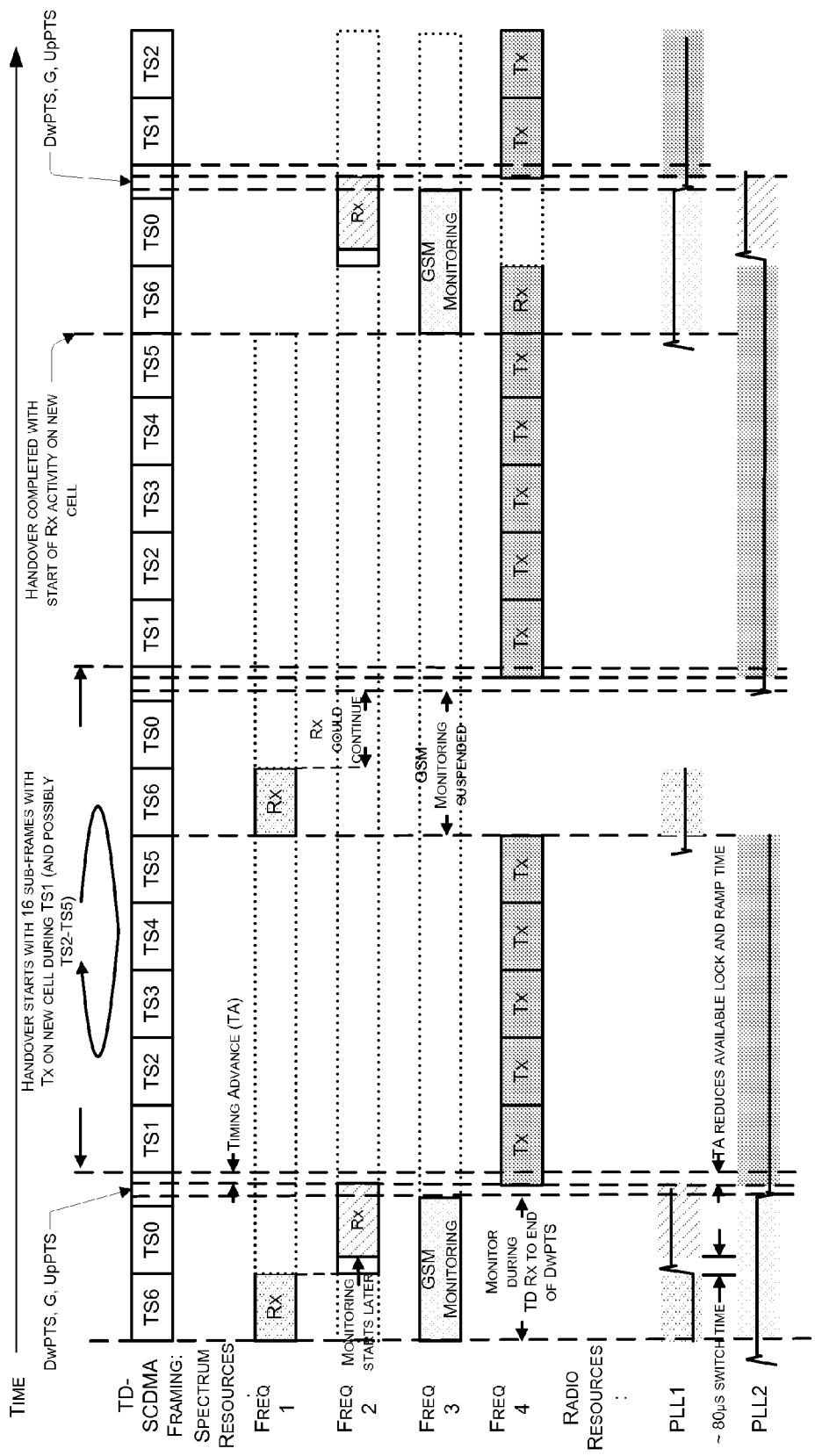
FIG. 7 illustrates a timing diagram of TD-SCDMA/GSM multimode operation during baton handover using two frequency synthesizers in accordance with another illustrative non-limiting embodiment of the present disclosure.

FIG. 7 illustrates a timing diagram of TD-SCDMA/GSM multimode operation during baton handover using two frequency synthesizers in accordance with another embodiment of the present disclosure.

Under a two-synthesizer multimode operation scheme such as that illustrated in FIG. 4, both of the frequency synthesizers, labeled as PLL1 and PLL2, are alternatively used for all TD-SCDMA activities and for GSM monitoring. Thus, before a baton handover, TD-SCDMA transmission and receiving activities on frequency 1 are performed during the time slots UpPTS, TS1, TS2, TS3, TS4, TS5, and TS6. TD-SCDMA signal reception on frequency 2 is optionally performed also using PLL1 during at least the time slots TS0 and DwPTS. GSM monitoring on frequency 3 is performed during at least the time slots TS6, TS0, and DwPTS. The period of time during which PLL1 is used and the period of time during which PLL2 is used approximately overlap during at least the TD-SCDMA time slots TS6, TS0, and DwPTS of each TD-SCDMA subframe.

According to the proposed inventive scheme, during the baton handover, GSM monitoring is suspended. TD-SCDMA transmission activities on frequency 4 are performed using either PLL1 or PLL2 during the time slots UpPTS, TS1, TS2, TS3, TS4, and TS5. TD-SCDMA receiving on frequency 1 is performed using the other one of the PLL1 and PLL2 that is not used for TD-SCDMA transmission on frequency 4. TD-SCDMA signal reception for signals from neighbor cells on frequency 2, during the time slots TS0, may be optionally suspended or performed.

Illustrative Two-Synthesizer Multimedia Broadcast and Multicast Services

Figure 8:
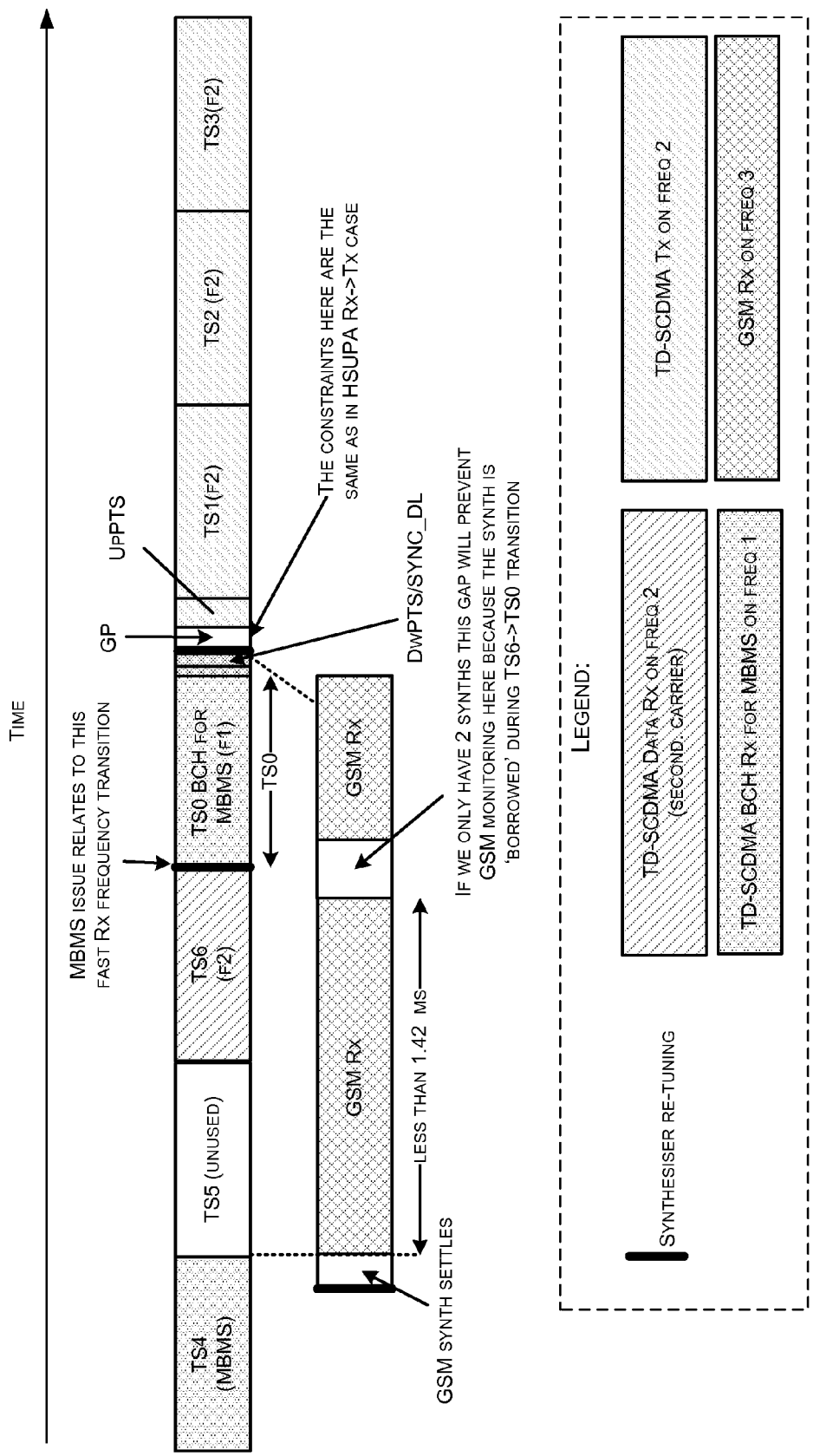
FIG. 8 illustrates a timing diagram of TD-SCDMA/GSM multimode operation during multimedia broadcast and multicast services using two frequency synthesizers in accordance with one illustrative non-limiting embodiment of the present disclosure.

FIG. 8 illustrates a timing diagram of TD-SCDMA/GSM multimode operation during multimedia broadcast and multicast services (MBMS) using two frequency synthesizers in accordance with one embodiment of the present disclosure.

In an MBMS scenario as shown in FIG. 8, TD-SCDMA broadcast channel (BCH) receiving for MBMS on frequency 1 occurs during the TD-SCDMA time slot TS0 and multicast channel (MCH) reception for MBMS on frequency 1 occurs during TD-SCDMA time slot TS4. TD-SCDMA transmission on frequency 2 occurs during the time slots UpPTS, TS1, TS2, and TS3. TD-SCDMA data receiving on frequency 2 occurs during the time slot TS6. GSM monitoring on frequency 3 occurs during a period of time that overlaps at least with the time slots TS6 and TS0. In the case that the time slot TS5 is not used for TD-SCDMA activities, GSM monitoring may start as early as the onset of the time slot TS5.

However, when only two frequency synthesizers are available with one used for TD-SCDMA activities and the other for GSM monitoring, an issue arises in the illustrated scenario as there is no time to relock the frequency synthesizer used for TD-SCDMA activities when transitioning from receiving data on frequency 2 during the time slot TS6 to receiving BCH data for MBMS on frequency 1 during the time slot TS0. As a result, two frequency synthesizers are required, with one used to receive TD-SCDMA data on frequency 2 during the time slot TS6 and the other used to receive TD-SCDMA BCH signals for MBMS on frequency 1 during the time slot TS0.

According to the proposed inventive scheme, the TD-SCDMA BCH receiving for MBMS has a higher priority than GSM monitoring, and thus GSM monitoring is interrupted, or suspended, during the time of TD-SCDMA BCH signal receiving for MBMS. In other words, GSM monitoring is suspended during a period of time that is scheduled for the GSM monitoring for at least a length that partially coincides with the TD-SCDMA time slot TS0 during which the BCH signals are received for MBMS.

Illustrative First Embodiment of GSM Monitoring Pattern

Figure 9:
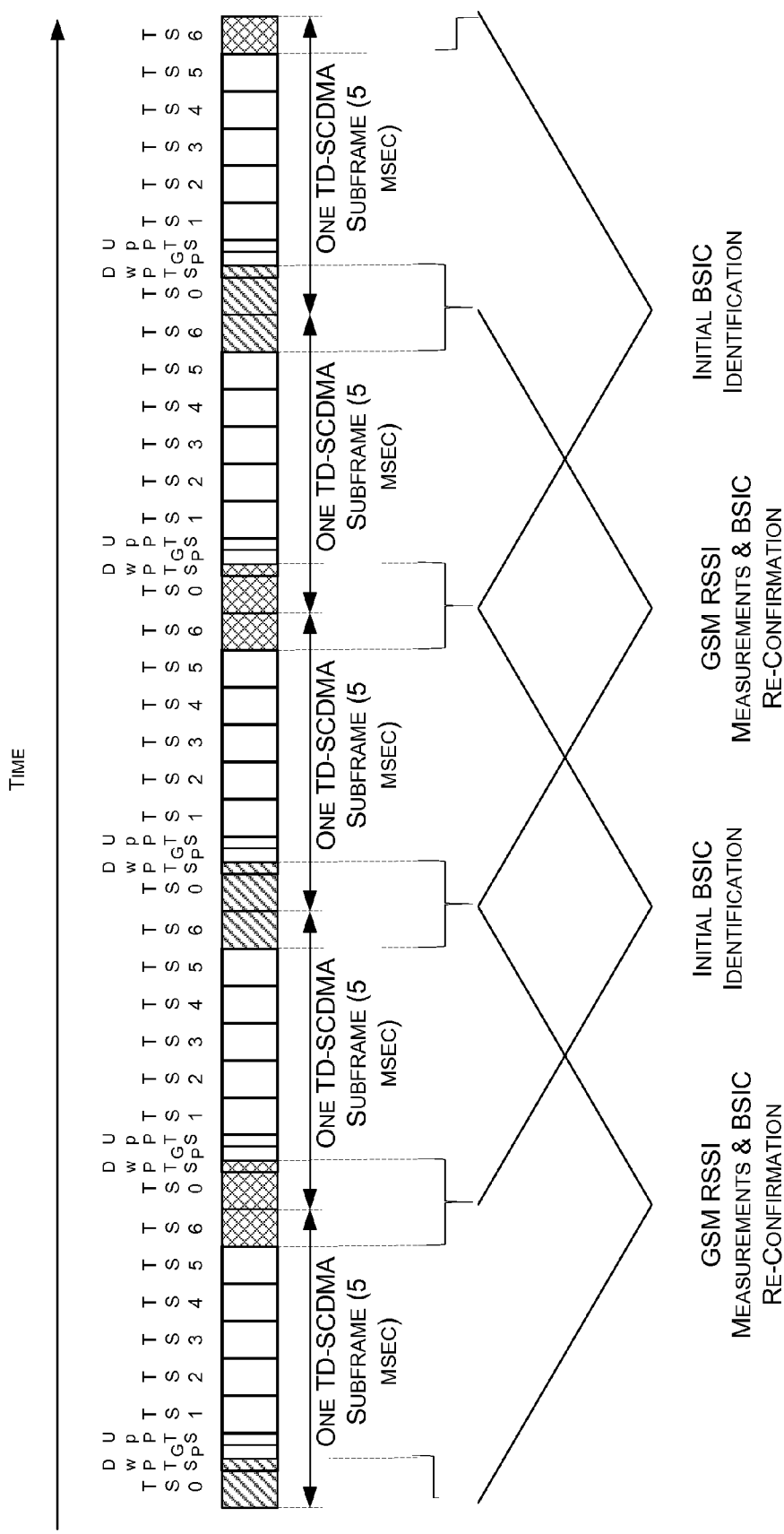
FIG. 9 illustrates a timing diagram of GSM monitoring patterns in accordance with one illustrative non-limiting embodiment of the present disclosure.

FIG. 9 illustrates a timing diagram of a GSM monitoring pattern in accordance with one embodiment of the present disclosure.

GSM monitoring includes, for example, monitoring to perform initial base station identity code (BSIC) identification, receiving to perform BSIC re-confirmation, and receiving signals that are indicative of GSM received signal strength indicator (RSSI) measurements. Specifics of the initial BSIC identification, BSIC re-confirmation and RSSI measurements can be found in the 3GPP ($3^{rd}$ Generation Partnership Project) specifications 25.123 and 25.133. The minimum length for a period of time for GSM monitoring is approximately 1.42-1.43 msec, and approximately overlaps with the TD-SCDMA time slots TS6, TS0, and DwPTS. According to the proposed inventive scheme, GSM monitoring is repeated every 5 msec, or every TD-SCDMA subframe.

In one embodiment, a first pattern of GSM monitoring for initial BSIC identification is repeated every two TD-SCDMA subframes, or 10 msec, and a second pattern of GSM monitoring for RSSI measurements and BSIC re-confirmation is repeated every two TD-SCDMA subframes, or 10 msec. The two patterns are interleaved over time, and the gap between each occurrence of GSM monitoring in each pattern is 10 msec apart.

Figure 10:
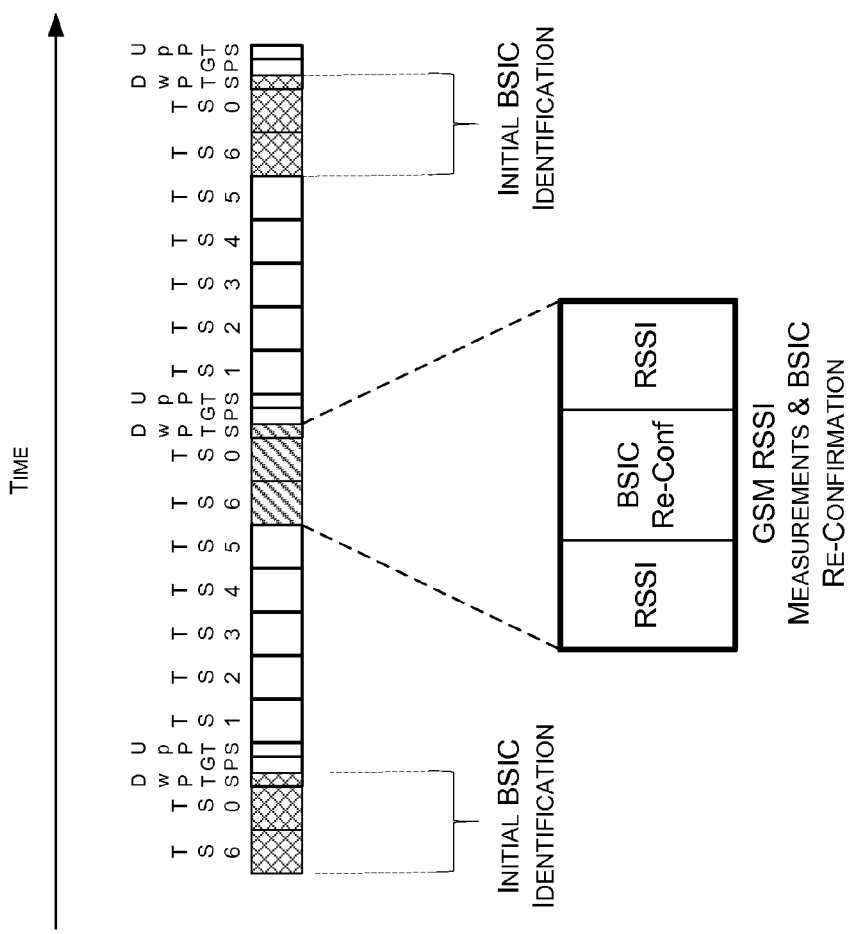
FIG. 10 illustrates a timing diagram of GSM monitoring of both RSSI measurements and BSIC re-confirmation in accordance with one illustrative non-limiting embodiment of the present disclosure.

In one embodiment, during the second pattern, signals for both RSSI measurements and BSIC re-confirmation are monitored. FIG. 10 illustrates one example in which during the period of approximately 1.42-1.43 msec of GSM monitoring, the monitoring for signals of RSSI measurements is first performed, followed by the monitoring for signals of BSIC re-confirmation, and followed by further monitoring for signals of RSSI measurements. Other conceivable variations of signal monitoring for both RSSI measurements and BSIC re-confirmation during the period of approximately 1.42-1.43 msec of GSM monitoring are also within the scope of the present disclosure. However, in the interest of brevity, detailed description of those variations will not be provided.

In an alternative embodiment, each occurrence of GSM monitoring in the second pattern is either for monitoring signals for RSSI measurements or for monitoring signals for BSIC re-confirmation. That is, either the monitoring for the RSSI measurements or the monitoring for the BSIC re-confirmation, but not both, is performed during each repetition of the GSM monitoring in the second pattern.

In one embodiment, with two frequency synthesizers utilized for TD-SCDMA/GSM multimode operation, TD-SCDMA activities are performed using either or both of the two frequency synthesizers. Accordingly, the initial BSIC identification, RSSI measurements, and BSIC re-conformation are periodically monitored using either or both of the two frequency synthesizers.

In some embodiments, signals for RSSI monitoring and BSIC re-confirmation may be received on multiple frequencies. More specifically, multiple RSSI measurements may be performed, each on a different frequency, and multiple BSICs may be re-confirmed, each on a different frequency, using the same synthesizer.

Illustrative Second Embodiment of GSM Monitoring Pattern

Figure 11:
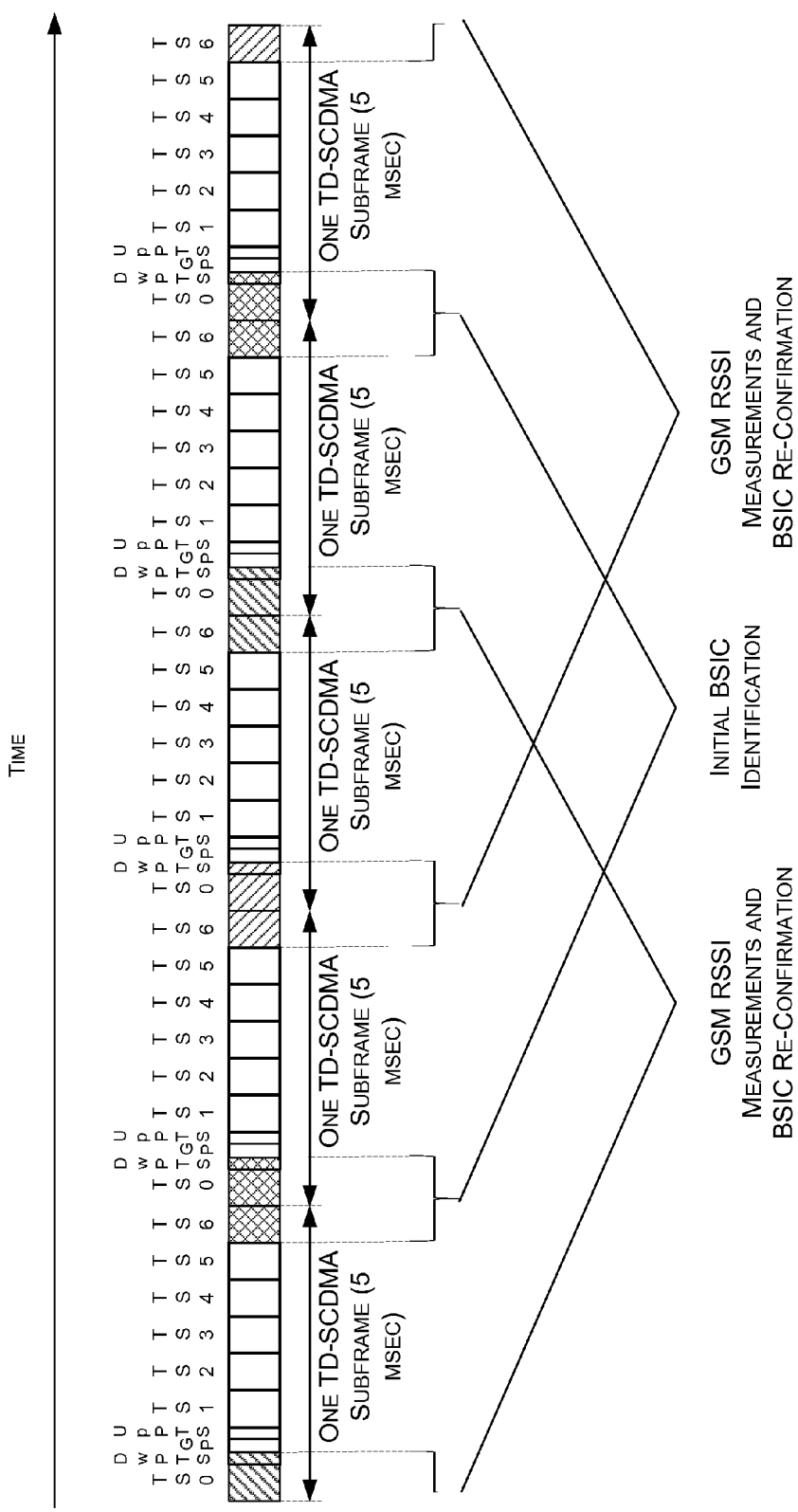
FIG. 11 illustrates a timing diagram of GSM monitoring patterns in accordance with another illustrative non-limiting embodiment of the present disclosure.

FIG. 11 illustrates a timing diagram of a GSM monitoring pattern in accordance with another embodiment of the present disclosure.

In one embodiment, a first pattern of GSM monitoring for signals indicative of RSSI measurements and BSIC re-confirmation signals is repeated every three TD-SCDMA subframes, or 15 msec. A second pattern of GSM monitoring for initial BSIC identification is repeated every three TD-SCDMA subframes, or 15 msec. A third pattern of GSM monitoring for signals indicative of RSSI measurements and BSIC re-confirmation signals is repeated every three TD-SCDMA subframes, or 15 msec. The three patterns are interleaved over time, and the gap between each occurrence of GSM monitoring in each pattern is 15 msec apart. During the first and third patterns, signals for both RSSI measurements and BSIC re-confirmation are monitored.

In one embodiment, with two frequency synthesizers utilized for TD-SCDMA/GSM multimode operation, TD-SCDMA activities are performed using either or both of the two frequency synthesizers. Accordingly, the initial BSIC identification, RSSI measurements, and BSIC re-conformation are periodically monitored using either or both of the two frequency synthesizers.

In some embodiments, signals for RSSI monitoring and BSIC re-confirmation may be received on multiple frequencies. More specifically, within one GSM gap monitoring period multiple RSSI measurements may be performed, each on a different frequency, and multiple BSICs may be re-confirmed, each on a different frequency, using the same synthesizer.

Illustrative Third Embodiment of GSM Monitoring Pattern

Figure 12:
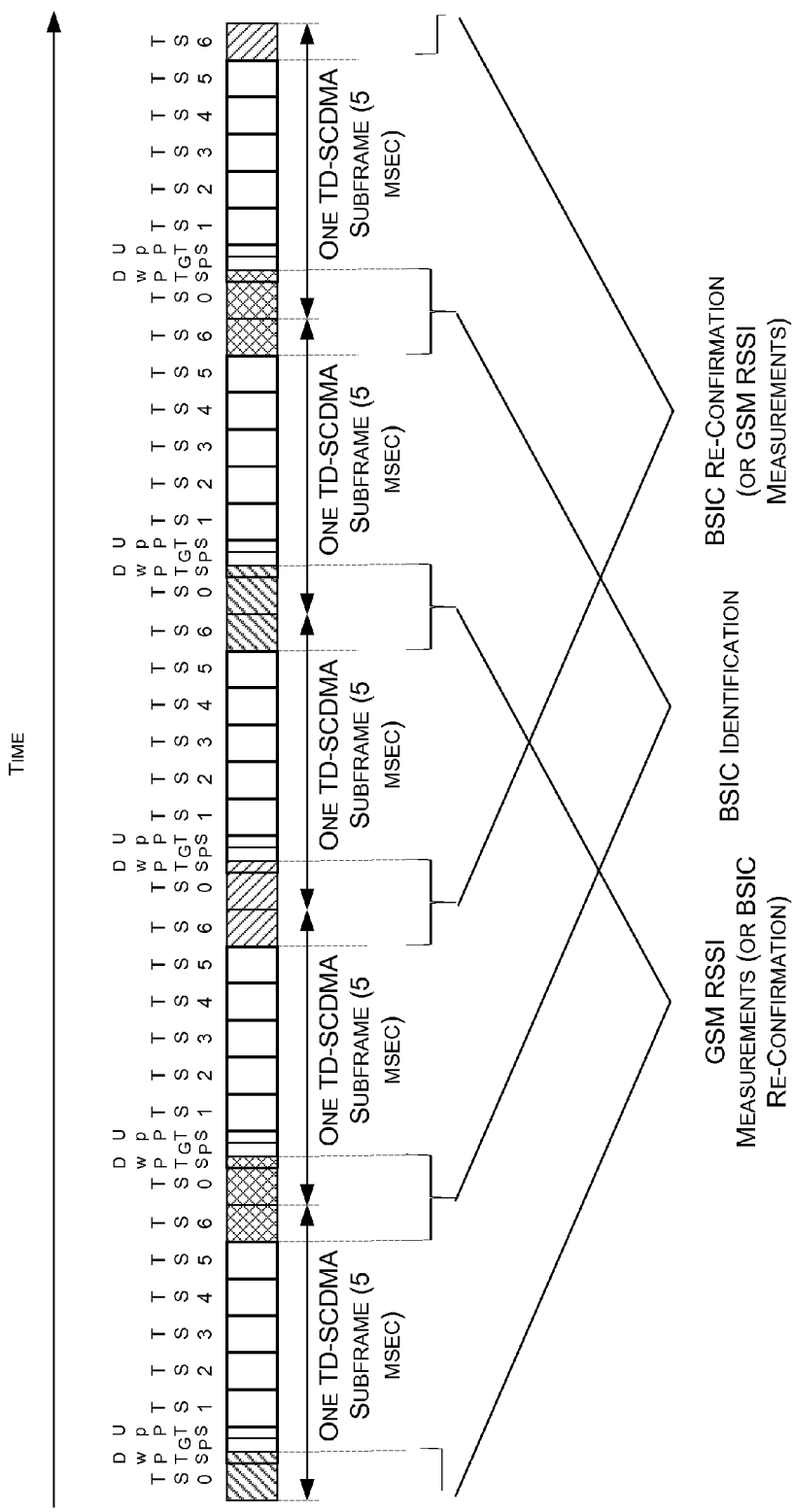
FIG. 12 illustrates a timing diagram of GSM monitoring patterns in accordance with yet another illustrative non-limiting embodiment of the present disclosure.

FIG. 12 illustrates a timing diagram of a GSM monitoring pattern in accordance with yet another embodiment of the present disclosure.

In one embodiment, a first pattern of GSM monitoring for either signals indicative of RSSI measurements or BSIC re-confirmation signals is repeated every three TD-SCDMA subframes, or 15 msec. A second pattern of GSM monitoring for initial BSIC identification is repeated every three TD-SCDMA subframes, or 15 msec. A third pattern of GSM monitoring for either signals indicative of RSSI measurements or BSIC re-confirmation signals is repeated every three TD-SCDMA subframes, or 15 msec. When signals indicative of RSSI measurements are received during the first pattern of GSM monitoring, BSIC re-confirmation signals are received during the third pattern of GSM monitoring, and vice versa. The three patterns are interleaved over time, and the gap between each occurrence of GSM monitoring in each pattern is 15 msec apart.

In one embodiment, each occurrence of GSM monitoring in the first pattern is for monitoring signals indicative of RSSI measurements and each occurrence of GSM monitoring in the third pattern is for monitoring signals for BSIC re-confirmation. In another embodiment, each occurrence of GSM monitoring in the first pattern is for monitoring signals for BSIC re-confirmation and each occurrence of GSM monitoring in the third pattern is for monitoring signals indicative of RSSI measurements. That is, either the monitoring for the RSSI measurements or the monitoring for the BSIC re-confirmation, but not both, is performed during each repetition of the GSM monitoring in the first and third patterns.

In other embodiments, the order of the first, second and third patterns differ from that shown in FIG. 12. For example, in an alternative embodiment, the first pattern may be for GSM monitoring for initial BSIC identification, the second pattern for GSM monitoring for either signals indicative of RSSI measurements or BSIC re-confirmation, and the third pattern for GSM monitoring for signals indicative of RSSI measurements and BSIC re-confirmation.

In one embodiment, with two frequency synthesizers utilized for TD-SCDMA/GSM multimode operation, TD-SCDMA activities are performed using either or both of the two frequency synthesizers. Accordingly, the initial BSIC identification, RSSI measurements, and BSIC re-conformation are periodically monitored using either or both of the two frequency synthesizers.

In some embodiments, signals for RSSI monitoring and BSIC re-confirmation may be received on multiple frequencies. More specifically, multiple RSSI measurements may be performed, each on a different frequency, and multiple BSICs may be re-confirmed, each on a different frequency, using the same synthesizer.

Illustrative Fourth Embodiment of GSM Monitoring Pattern

Figure 13:
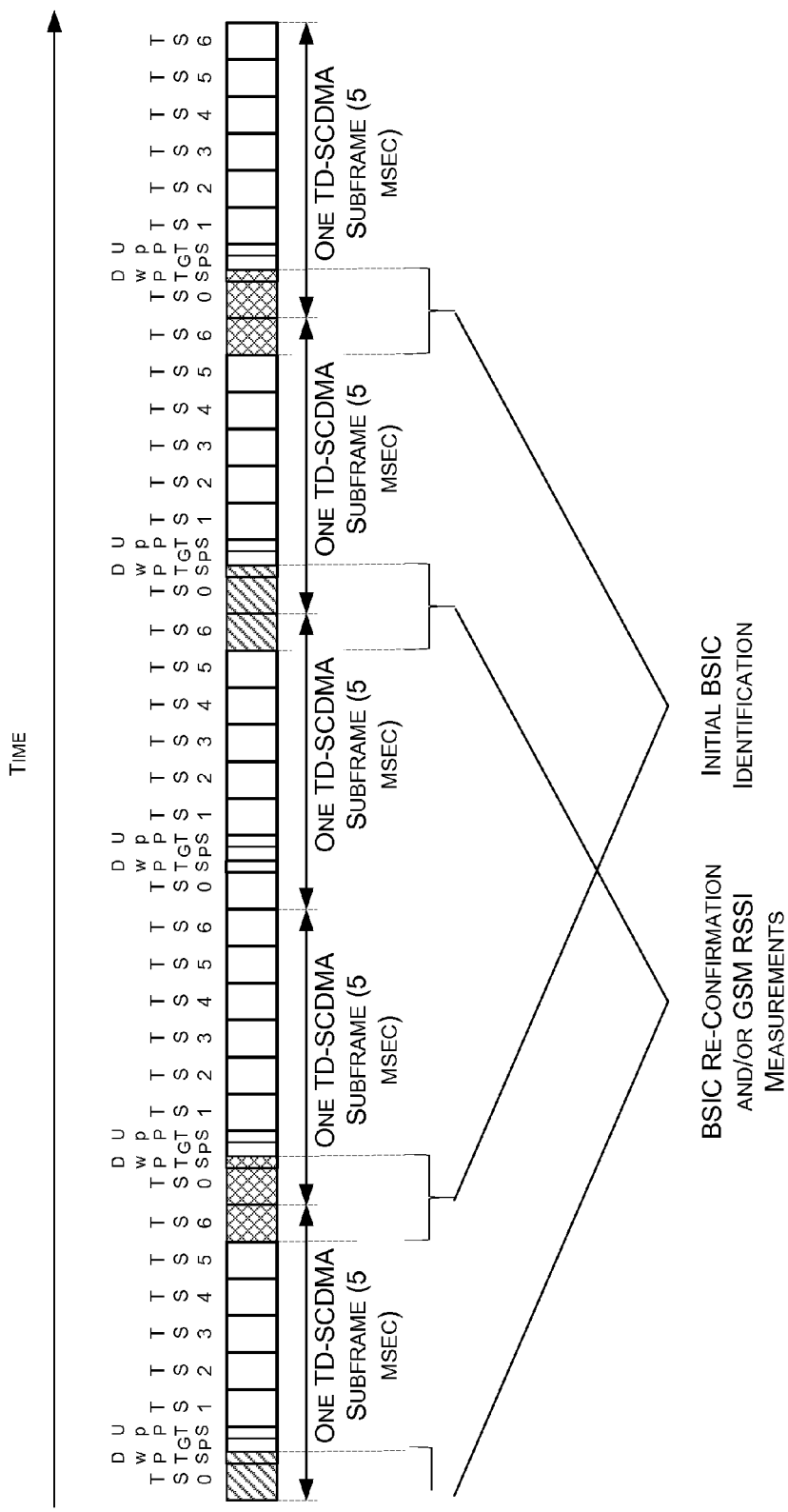
FIG. 13 illustrates a timing diagram of GSM monitoring patterns in accordance with still another illustrative non-limiting embodiment of the present disclosure.

FIG. 13 illustrates a timing diagram of a GSM monitoring pattern in accordance with still another embodiment of the present disclosure.

In one embodiment, a first pattern of GSM monitoring for signals indicative of RSSI measurements and BSIC re-confirmation signals is repeated every three TD-SCDMA subframes, or 15 msec. A second pattern of GSM monitoring for initial BSIC identification is repeated every three TD-SCDMA subframes, or 15 msec. A third pattern of no GSM monitoring, or idle time, is repeated every three TD-SCDMA subframes, or 15 msec. The three patterns are interleaved over time, and the gap between each occurrence of GSM monitoring in each pattern is 15 msec apart.

In other embodiments, the order of the first, second and third patterns differ from that shown in FIG. 13. For example, in an alternative embodiment, the first pattern may be for GSM monitoring for initial BSIC identification, the second pattern for GSM monitoring for signals indicative of RSSI measurements and BSIC re-confirmation, and the third pattern for idle time.

In one embodiment, each occurrence of GSM monitoring in the first pattern is for monitoring both signals indicative of RSSI measurements and signals for BSIC re-confirmation.

In another embodiment, each occurrence of GSM monitoring in the first pattern is for monitoring either signals indicative of RSSI measurements or signals for BSIC re-confirmation. That is, either the monitoring for the RSSI measurements or the monitoring for the BSIC re-confirmation, but not both, is performed during each repetition of the GSM monitoring in the first and third patterns.

In one embodiment, with two frequency synthesizers utilized for TD-SCDMA/GSM multimode operation, TD-SCDMA activities are performed using either or both of the two frequency synthesizers. Accordingly, initial BSIC identification, RSSI measurements, and BSIC re-conformation are periodically monitored using either or both of the two frequency synthesizers.

In some embodiments, signals for RSSI monitoring and BSIC re-confirmation may be received on multiple frequencies. More specifically, multiple RSSI measurements may be performed, each on a different frequency, and multiple BSICs may be re-confirmed, each on a different frequency, using the same synthesizer.

Illustrative Two-Synthesizer Multimode Mobile Telecommunication Device

Figure 14:
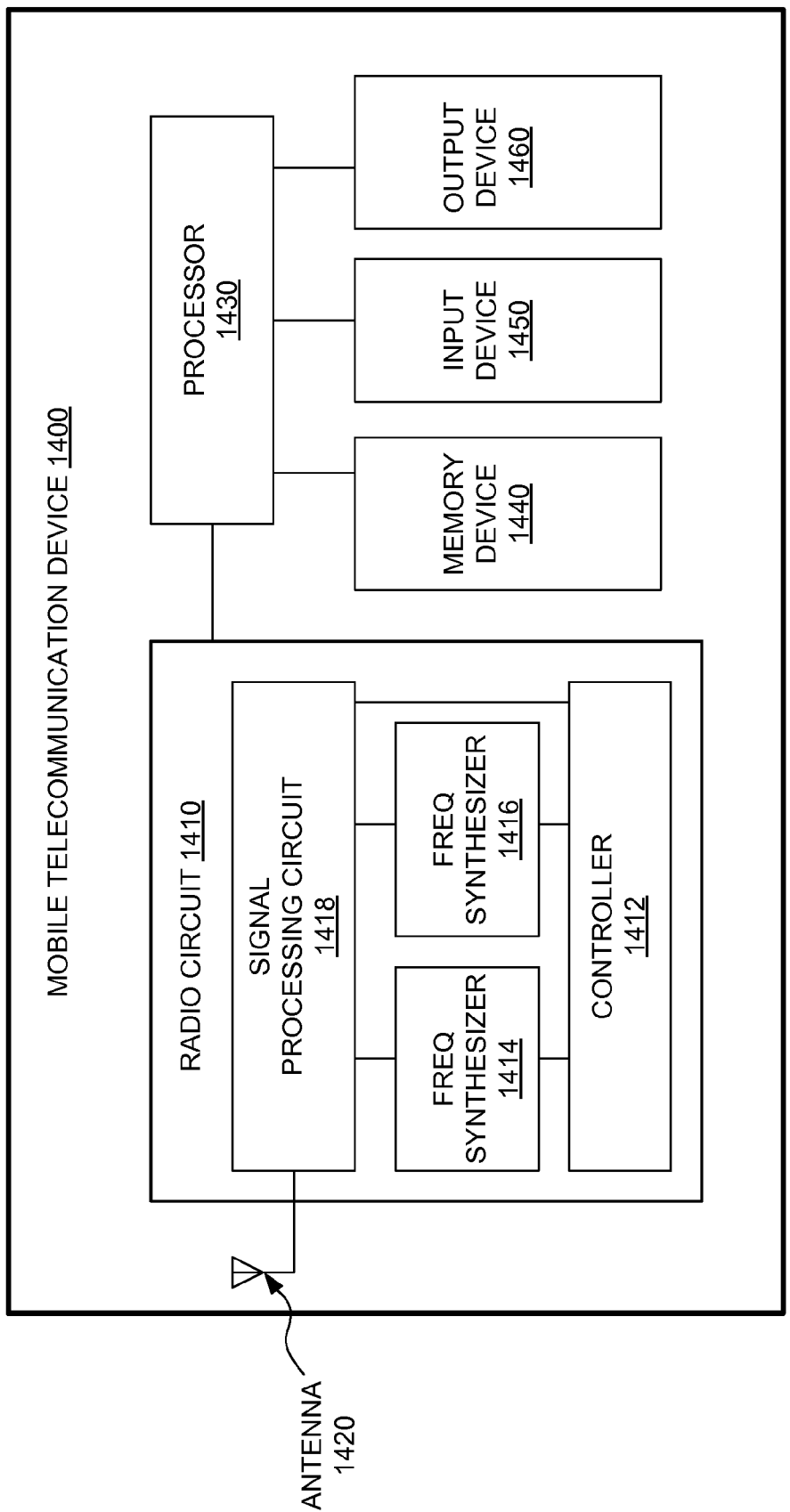
FIG. 14 illustrates a block diagram of a mobile telecommunication device having a radio circuit capable of TD-SCDMA/GSM multimode operation with two frequency synthesizers in accordance with one illustrative non-limiting embodiment of the present disclosure.

FIG. 14 illustrates a block diagram of a representative mobile telecommunication device 1400 that may implement the techniques for TD-SCDMA/GSM multimode operation with two frequency synthesizers in accordance with the present disclosure.

It will be readily appreciated that the techniques disclosed herein may be implemented in other mobile telecommunication devices, apparatuses, and systems. The mobile telecommunication device 1400 shown in FIG. 14 is only one example of a mobile telecommunication device, and is not intended to suggest any limitation as to the scope of use or functionality of the mobile telecommunication and network architectures.

In at least one configuration, the mobile telecommunication device 1400 typically includes at least one processor 1430 and memory device 1440. Depending on the exact configuration and type of the mobile telecommunication device 1400, the memory device 1440 may be volatile (such as RAM), non-volatile (such as ROM, flash memory, etc.) or some combination thereof. The memory device 1440 may include an operating system, one or more program modules, and/or program data. The mobile telecommunication device 1400 may also have input device(s) 1450 such as touch input device, keyboard, mouse, pen, voice input device, etc. The mobile telecommunication device 1400 may also have output device(s) 1460 such as display, speaker, etc.

As shown in FIG. 14, the mobile telecommunication device 1400 further includes a radio circuit 1410, coupled to the processor 1430, and an antenna 1420 that is coupled to the radio circuit 1410. In one embodiment, the radio circuit 1410 is a transceiver, and includes a first frequency synthesizer 1414, a second frequency synthesizer 1416, a signal processing circuit 1418, and a controller 1412 that is coupled to the first frequency synthesizer 1414, second frequency synthesizer 1416, and signal processing circuit 1418. The antenna 1420 is used by the radio circuit 1410 for TD-SCDMA transmission and receiving, as well as GSM monitoring, as described above.

The controller 1412 controls the operations of the first frequency synthesizer 1414, second frequency synthesizer 1416, and signal processing circuit 1418 to perform the TD-SCDMA/GMS multimode operations described above using the two frequency synthesizers 1414 and 1416.

In one embodiment, the controller 1412 controls the operations of the first frequency synthesizer 1414, second frequency synthesizer 1416, and signal processing circuit 1418 to render wireless communications based on the TD-SCDMA standard using either or both of the first and second frequency synthesizers 1414 and 1416, and to receive signals based on the GSM standard using either or both of the first and second frequency synthesizers 1414 and 1416.

In another embodiment, the controller 1412 controls the operations of the first frequency synthesizer 1414, second frequency synthesizer 1416, and signal processing circuit 1418 to: (1) transmit or receive signals based on the TD-SCDMA standard on a first frequency (e.g., frequency 1) using the first frequency synthesizer 1414 during one or more of the TD-SCDMA time slots UpPTS, TS1, TS2, TS3, TS4, TS5, or TS6; (2) receive signals, such as inter-frequency monitoring, intra-frequency monitoring, BCH receiving, S-CCPCH receiving and/or PICH receiving, based on the TD-SCDMA standard on a second frequency (e.g., frequency 2) using the first frequency synthesizer 1414 during at least one TD-SCDMA time slot TS0; and (3) receive signals based on the GSM standard on a third frequency (e.g., frequency 3) using the second frequency synthesizer 1416 during one or more of the TD-SCDMA time slots TS6 and TS0.

In yet another embodiment, the controller 1412 controls the operations of the first frequency synthesizer 1414, second frequency synthesizer 1416, and signal processing circuit 1418 such that the first frequency synthesizer 1414 is used during a first time period, that is repeated periodically, to: (1) receive signals based on the GSM standard on the third frequency during at least the TD-SCDMA time slots TS6, TS0, and DwPTS; (2) transmit or receive signals based on the TD-SCDMA standard on the first frequency during the immediately subsequent TD-SCDMA time slots UpPTS, TS1, TS2, TS3, TS4, and TS5; (3) receive signals based on the TD-SCDMA standard on the first frequency during the immediately subsequent TD-SCDMA time slot TS6; and (4) receive signals, such as inter-frequency monitoring, intra-frequency monitoring, BCH receiving, S-CCPCH receiving and/or PICH receiving, based on the TD-SCDMA standard on the second frequency during at least the immediately subsequent TD-SCDMA time slots TS0 and DwPTS.

Further, the second frequency synthesizer 1416 is used during a second time period, that is repeated periodically, to: (1) receive signals based on the GSM standard on the third frequency during at least the TD-SCDMA time slots TS6, TS0, and DwPTS; (2) transmit or receive signals based on the TD-SCDMA standard on the first frequency during the immediately subsequent TD-SCDMA time slots UpPTS, TS1, TS2, TS3, TS4, and TS5; (3) receive signals based on the TD-SCDMA standard on the first frequency during the immediately subsequent TD-SCDMA time slot TS6; and (4) receive signals, such as inter-frequency monitoring, intra-frequency monitoring, BCH receiving, S-CCPCH receiving and/or PICH receiving, based on the TD-SCDMA standard on the second frequency during at least the immediately subsequent TD-SCDMA time slots TS0 and DwPTS.

Each repetition of the first time period and each repetition of the second time period approximately overlap for at least an amount of time equal to a sum of the TD-SCDMA time slots TS6, TS0, and DwPTS. Moreover, each of the first and second time periods respectively spans from the time slot TS6 of a TD-SCDMA subframe to at least the time slot DwPTS subsequent the time slot TS6 of an adjacent TD-SCDMA subframe.

In yet another embodiment, the controller 1412 controls the operations of the first frequency synthesizer 1414, second frequency synthesizer 1416, and signal processing circuit 1418 to carry out a baton handover as described above with reference to FIGS. 6 and 7.

Before the baton handover, the controller 1412 controls the operations of the first frequency synthesizer 1414, second frequency synthesizer 1416, and signal processing circuit 1418 to: (1) transmit or receive signals based on the TD-SCDMA standard on a first frequency (e.g., frequency 1) during one or more of the TD-SCDMA time slots UpPTS, TS1, TS2, TS3, TS4, and TS5; (2) receive signals based on the TD-SCDMA standard on the first frequency during individual TD-SCDMA time slots TS6; (3) receive signals, such as inter-frequency monitoring, intra-frequency monitoring, BCH receiving, S-CCPCH receiving and/or PICH receiving, based on the TD-SCDMA standard on a second frequency (e.g., frequency 2) during at least one TD-SCDMA time slot TS0; and (4) receive signals based on the GSM standard on a third frequency (e.g., frequency 3).

During the baton handover, the controller 1412 controls the operations of the first frequency synthesizer 1414, second frequency synthesizer 1416, and signal processing circuit 1418 to: (1) transmit or receive signals based on the TD-SCDMA standard on a fourth frequency (e.g., frequency 4) during one or more of the TD-SCDMA time slots UpPTS, TS1, TS2, TS3, TS4, and TS5; (2) receive signals based on the TD-SCDMA standard on the first frequency during individual TD-SCDMA time slots TS6; (3) suspend the monitoring for signals based on the GSM standard on the third frequency; and (4) optionally continue the signal reception based on the TD-SCDMA standard on the second frequency during at least one TD-SCDMA time slot TS0.

In a further embodiment, the controller 1412 controls the operations of the first frequency synthesizer 1414, second frequency synthesizer 1416, and signal processing circuit 1418 to: (1) receive BCH signals for MBMS on a first frequency (e.g., frequency 1) during one of the TD-SCDMA time slots TS0 when the wireless communications based on the TD-SCDMA standard are rendered on a second frequency (e.g., frequency 2); and (2) suspend monitoring for signals based on the GSM standard on a third frequency (e.g., frequency 3) during a period of time that is scheduled for the monitoring for signals based on the GSM standard, where the period of time at least partially coincides with the TD-SCDMA time slot TS0 during which the BCH signals are received for MBMS.

Conclusion

The above-described techniques pertain to low-cost multimode operation in mobile telecommunications involving the TD-SCDMA standard and the GSM standard. Although the techniques have been described in language specific to structural features and/or methodological acts, it is to be understood that the appended claims are not necessarily limited to the specific features or acts described. Rather, the specific features and acts are disclosed as exemplary forms of implementing such techniques. Although the disclosed techniques may have been described in the context of a worst-case scenario in which HSUPA protocol category 5/6 2.2 Mbps uplink is occurring, the disclosed techniques can be applied to other scenarios and operating conditions. Furthermore, although the techniques may have been described in the context of TD-SCDMA/GSM multimode operation, the disclosed techniques may be applied in any other suitable context.

What is claimed is:

1. A method of multimode operation in a mobile telecommunication device, the method comprising:
rendering wireless communications based on the Time Division Synchronous Code Division Multiple Access (TD-SCDMA) standard using either or both of first and second frequency synthesizers of the mobile telecommunication device; and
performing reception of signals based on the Global System for Mobile telecommunications (GSM) standard using either or both of the first and second frequency synthesizers of the mobile telecommunication device.

2. The method of claim 1, wherein:
rendering wireless communications based on the TD-SCDMA standard using either or both of first and second frequency synthesizers comprises:
performing transmission and reception of signals based on the TD-SCDMA standard on a first frequency using the first frequency synthesizer, and
optionally performing reception of signals based on the TD-SCDMA standard on a second frequency using the first frequency synthesizer, the second frequency being optionally the same as or different from the first frequency; and wherein:
performing reception of signals based on the GSM standard using either or both of the first and second frequency synthesizers comprises:
performing reception of signals based on the GSM standard on a third frequency using the second frequency synthesizer, the third frequency being different from the first and second frequencies.

3. The method of claim 2, wherein:
performing transmission and reception of signals based on the TD-SCDMA standard on the first frequency using the first frequency synthesizer comprises:
performing transmission or reception of signals based on the TD-SCDMA standard on the first frequency using the first frequency synthesizer during one or more of the TD-SCDMA time slots UpPTS, TS1, TS2, TS3, TS4, TS5, and TS6; wherein:
optionally performing reception of signals based on the TD-SCDMA standard on the second frequency using the first frequency synthesizer comprises:
optionally performing reception of signals based on the TD-SCDMA standard on the second frequency using the first frequency synthesizer during at least one TD-SCDMA time slot TS0; and wherein:
performing reception of signals based on the GSM standard on the third frequency using the second frequency synthesizer comprises:
performing reception of signals based on the GSM standard on the third frequency using the second frequency synthesizer during at least one or more of the TD-SCDMA time slots TS6, TS0, and DwPTS.

4. The method of claim 3, wherein optionally performing reception of signals based on the TD-SCDMA standard on the second frequency using the first frequency synthesizer during at least one TD-SCDMA time slot TS0 comprises:

optionally starting to perform reception of signals based on the TD-SCDMA standard on the second frequency using the first frequency synthesizer at a predetermined time after the onset of the at least one TD-SCDMA time slot TS0.

5. The method of claim 2, further comprising:
before a baton handover:
performing transmission or reception of signals based on the TD-SCDMA standard on the first frequency using the first frequency synthesizer during one or more of the TD-SCDMA time slots UpPTS, TS1, TS2, TS3, TS4, TS5, and TS6;
optionally performing reception of signals based on the TD-SCDMA standard on the second frequency using the first frequency synthesizer during at least one TD-SCDMA time slot TS0; and
performing reception of signals based on the GSM standard on the third frequency using the second frequency synthesizer;
during the baton handover:
performing reception of signals based on the TD-SCDMA standard on the first frequency using the first frequency synthesizer during one or more of the TD-SCDMA time slots TS2, TS3, TS4, TS5, and TS6;
performing transmission of signals based on the TD-SCDMA standard on a fourth frequency using the first frequency synthesizer during one or more of the TD-SCDMA time slots UpPTS, TS1, TS2, TS3, TS4, and TS5, the fourth frequency being different from the first, second, and third frequencies;
suspending reception of signals based on the GSM standard on the third frequency; and
optionally continuing receiving signals based on the TD-SCDMA standard on the second frequency during at least one TD-SCDMA time slot TS0; and
after the baton handover:
performing transmission or reception of signals based on the TD-SCDMA standard on the fourth frequency using the first frequency synthesizer during one or more of the TD-SCDMA time slots UpPTS, TS1, TS2, TS3, TS4, TS5, and TS6;
optionally performing reception of signals based on the TD-SCDMA standard on the second frequency using the first frequency synthesizer during at least one TD-SCDMA time slot TS0; and
performing reception of signals based on the GSM standard on the third frequency using the second frequency synthesizer.

6. The method of claim 1, wherein:
rendering wireless communications based on the TD-SCDMA standard using either or both of first and second frequency synthesizers comprises:
performing transmission and reception of signals based on the TD-SCDMA standard on a first frequency using both of the first and second frequency synthesizers; and
optionally performing reception of signals based on the TD-SCDMA standard on a second frequency using both of the first and second frequency synthesizers, the second frequency being optionally the same as or different from the first frequency; and wherein:
performing reception of signals based on the GSM standard using either or both of the first and second frequency synthesizers comprises:
performing reception of signals based on the GSM standard on a third frequency using both of the first and second frequency synthesizers, the third frequency being different from the first and second frequencies.

7. The method of claim 6, wherein:
performing reception of signals based on the GSM standard on the third frequency, transmission and reception of signals based on the TD-SCDMA standard on the first frequency, and optional reception of signals based on the TD-SCDMA standard on the second frequency using both of the first and second frequency synthesizers comprises:
performing transmission and reception of signals based on the TD-SCDMA standard on the first frequency, and reception of signals from the neighbor cell based on the TD-SCDMA standard on the second frequency using the first frequency synthesizer during a first time period that is repeated periodically; and
performing reception of signals based on the GSM standard on the third frequency, using the second frequency synthesizer during a second time period that is repeated periodically, wherein:
each repetition of the first time period and each repetition of the second time period approximately overlap for at least an amount of time equal to a sum of the TD-SCDMA time slots TS6, TS0, and downlink pilot time slot (DwPTS), and
each of the first and second time periods respectively spans within a time period containing at least part of one of the TD-SCDMA time slots TS6, TS0, and DwPTS from the time slot TS6 of a TD-SCDMA subframe to at least the time slot DwPTS subsequent the time slot TS6 of an adjacent TD-SCDMA subframe.

8. The method of claim 6, wherein:
during the first time period, reception of signals based on the GSM standard on the third frequency during at least the TD-SCDMA time slots TS6, TS0, and DwPTS is performed using the second frequency synthesizer, and transmission or reception of signals based on the TD-SCDMA standard on the first frequency during one or more of the immediately subsequent TD-SCDMA time slots UpPTS, TS1, TS2, TS3, TS4, TS5, and TS6, and optional reception of signals based on the TD-SCDMA standard on the second frequency during at least the immediately subsequent TD-SCDMA time slots TS0 and DwPTS are performed using the first frequency synthesizer; and
during the second time period, reception of signals based on the GSM standard on the third frequency during at least the TD-SCDMA time slots TS6, TS0, and DwPTS is performed using the first frequency synthesizer, and transmission or reception of signals based on the TD-SCDMA standard on the first frequency during one or more of the immediately subsequent TD-SCDMA time slots UpPTS, TS1, TS2, TS3, TS4, TS5, and TS6, and optional reception of signals based on the TD-SCDMA standard on the second frequency during at least one or more of the immediately subsequent TD-SCDMA time slots TS6, TS0 and DwPTS are performed using the second frequency synthesizer.

9. The method of claim 6, further comprising:
before a baton handover:
performing transmission or reception of signals based on the TD-SCDMA standard on the first frequency using the first frequency synthesizer during one or more of the TD-SCDMA time slots UpPTS, TS1, TS2, TS3, TS4, TS5, and TS6;

optionally performing reception of signals based on the TD-SCDMA standard on the second frequency using the first frequency synthesizer during at least one TD-SCDMA time slot TS0; and performing reception of signals based on the GSM standard on the third frequency using the second frequency synthesizer;

during the baton handover:

performing reception of signals based on the TD-SCDMA standard on the first frequency using the first frequency synthesizer during one or more of the TD-SCDMA time slots TS2, TS3, TS4, TS5, and TS6;

performing transmission of signals based on the TD-SCDMA standard on a fourth frequency using the second frequency synthesizer during one or more of the TD-SCDMA time slots UpPTS, TS1, TS2, TS3, TS4, and TS5, the fourth frequency being different from the first, second, and third frequencies;

suspending reception of signals based on the GSM standard on the third frequency; and optionally continuing receiving signals based on the TD-SCDMA standard on the second frequency during at least one TD-SCDMA time slot TS0; and after the baton handover:

performing transmission or reception of signals based on the TD-SCDMA standard on the fourth frequency using the second frequency synthesizer during one or more of the TD-SCDMA time slots UpPTS, TS1, TS2, TS3, TS4, TS5, and TS6;

optionally performing reception of signals based on the TD-SCDMA standard on the second frequency using the second frequency synthesizer during at least one TD-SCDMA time slot TS0; and performing reception of signals based on the GSM standard on the third frequency using the first frequency synthesizer.

10. The method of claim 1, further comprising:

receiving broadcast channel (BCH) signals for multimedia broadcast and multicast services (MBMS) on a first frequency during a TD-SCDMA time slot TS0 when the wireless communications based on the TD-SCDMA standard are rendered on a second frequency that is optionally the same as or different from the first frequency; and suspending receiving signals based on the GSM standard on a third frequency during a period of time that is originally scheduled for receiving signals based on the GSM standard, the period of time at least partially coinciding with the TD-SCDMA time slot TS0 during which the BCH signals are received for MBMS, the third frequency being different from the first and second frequencies.

11. A method of multimode operation in a mobile telecommunication device, the method comprising:

rendering wireless communication based on the Time Division Synchronous Code Division Multiple Access (TD-SCDMA) standard using either or both of a first frequency synthesizer and a second frequency synthesizer of the mobile telecommunication device;

periodically monitoring for initial base station identity code (BSIC) identification based on the Global System for Mobile telecommunications (GSM) standard using either or both of the first and second frequency synthesizers of the mobile telecommunication device during a first time period that is repeated in a first pattern and overlaps one or more TD-SCDMA time slots; and periodically monitoring for received signal strength indicator (RSSI) measurements, BSIC re-confirmation, or both based on the GSM standard using either or both of the first and second frequency synthesizers of the mobile telecommunication device during a second time period that is repeated in a second pattern and overlaps one or more TD-SCDMA time slots, the first and the second patterns being interleaved over time such that the monitoring for the initial BSIC identification, the monitoring for the RSSI measurements, and the monitoring for the BSIC re-confirmation alternatively overlap consecutive TD-SCDMA subframes.

12. The method of claim 11, wherein each of the first time period and the second time period is at least approximately 1.42 msec in length and is repeated once every two TD-SCDMA subframes to approximately correspond in time with TD-SCDMA time slots TS6, TS0, and downlink pilot time slot (DwPTS) with respect to the wireless communication based on the TD-SCDMA standard.

13. The method of claim 11, wherein periodically monitoring for RSSI measurements, BSIC re-confirmation, or both based on the GSM standard during a second time period that is repeated in a second pattern and overlaps in time with one or more TD-SCDMA time slots comprises:

monitoring for both the RSSI measurements and the BSIC re-confirmation during each repetition of the second time period.

14. The method of claim 11, wherein periodically monitoring for RSSI measurements, BSIC re-confirmation, or both based on the GSM standard during a second time period that is repeated in a second pattern and overlaps in time with one or more TD-SCDMA time slots comprises:

alternatively monitoring for the RSSI measurements and the BSIC re-confirmation such that either the monitoring for the RSSI measurements or the monitoring for the BSIC re-confirmation, but not both, is performed during each repetition of the second time period.

15. The method of claim 11, further comprising:

periodically monitoring for RSSI measurements, BSIC re-confirmation, or both, based on the GSM standard during a third time period, or maintaining an idle time during the third time period, the third time period being repeated in a third pattern and overlaps one or more TD-SCDMA time slots, and the first, the second, and the third patterns being interleaved over time.

16. The method of claim 15, wherein each of the first time period, the second time period, and the third time period is at least approximately 1.42 msec in length and is repeated once every three TD-SCDMA subframes to correspond in time with TD-SCDMA time slots TS6, TS0, and downlink pilot time slot (DwPTS) with respect to the wireless communication based on the TD-SCDMA standard.

17. A radio circuit capable of multimode operation in a mobile telecommunication device, the circuit comprising:

a first frequency synthesizer;

a second frequency synthesizer;

a signal processing circuit; and a controller coupled to control operations of the first and second frequency synthesizers and the signal processing circuit to:

render wireless communications based on the Time Division Synchronous Code Division Multiple Access (TD-SCDMA) standard using either or both of the first and second frequency synthesizers; and perform reception of signals based on the Global System for Mobile telecommunications (GSM) standard using either or both of the first and second frequency synthesizers.

18. The circuit of claim 17, wherein the controller controls the first and second frequency synthesizers and the signal processing circuit to:
transmit or receive signals based on the TD-SCDMA standard on a first frequency using the first frequency synthesizer during one or more of the TD-SCDMA time slots UpPTS, TS1, TS2, TS3, TS4, TS5, and TS6;
optionally receive signals based on the TD-SCDMA standard on a second frequency using the first frequency synthesizer during at least one TD-SCDMA time slot TS0, the second frequency being optionally the same as or different from the first frequency; and
receive signals based on the GSM standard on a third frequency using the second frequency synthesizer during one or more of the TD-SCDMA time slots TS6 and TS0, the third frequency being different from the first and second frequencies.

19. The circuit of claim 17, wherein the controller controls the first and second frequency synthesizers and the signal processing circuit to:
during a first time period that is repeated periodically, using the second frequency synthesizer, perform reception of signals based on the GSM standard on the third frequency during at least one or more of the TD-SCDMA time slots TS6, TS0, and downlink pilot time slot (DwPTS);
during the first time period, using the first frequency synthesizer, perform transmission or reception of signals based on the TD-SCDMA standard on the first frequency during one or more of the immediately subsequent TD-SCDMA time slots UpPTS, TS1, TS2, TS3, TS4, TS5, and TS6, and optionally perform reception of signals based on the TD-SCDMA standard on the second frequency during at least the immediately subsequent TD-SCDMA time slots TS0 and DwPTS;
during a second time period that is repeated periodically, using the first frequency synthesizer, perform reception of signals based on the GSM standard on the third frequency during at least the TD-SCDMA time slots TS6, TS0, and DwPTS; and
during the second time period, using the second frequency synthesizer, perform transmission or reception of based on the TD-SCDMA standard on the first frequency during one or more of the immediately subsequent TD-SCDMA time slots UpPTS, TS1, TS2, TS3, TS4, TS5, and TS6, and optionally perform reception of signals based on the TD-SCDMA standard on the second frequency during at least the immediately subsequent TD-SCDMA time slots TS0 and DwPTS; wherein:
each repetition of the first time period and each repetition of the second time period overlap for approximately at least an amount of time equal to a sum of the TD-SCDMA time slots TS6, TS0, and DwPTS, and each of the first and second time periods respectively spans from the time slot TS6 of a TD-SCDMA subframe to at least the time slot DwPTS subsequent the time slot TS6 of an adjacent TD-SCDMA subframe.

20. The circuit of claim 17, wherein the controller controls the first and second frequency synthesizers and the signal processing circuit to:
before a baton handover:
perform transmission or reception of signals based on the TD-SCDMA standard on a first frequency during one or more of the TD-SCDMA time slots UpPTS, TS1, TS2, TS3, TS4, TS5, and TS6;
optionally perform reception of signals based on the TD-SCDMA standard on a second frequency during at least one TD-SCDMA time slot TS0, the second frequency being optionally the same as or different from the first frequency; and
perform reception of signals based on the GSM standard on a third frequency, the third frequency being different from the first and second frequencies; and
during the baton handover:
perform transmission or reception of signals based on the TD-SCDMA standard on a fourth frequency during one or more of the TD-SCDMA time slots UpPTS, TS1, TS2, TS3, TS4, and TS5, the fourth frequency being different from the first, second, and third frequencies;
perform transmission or reception of signals based on the TD-SCDMA standard on the first frequency during the TD-SCDMA time slot TS6;
suspend receiving signals based on the GSM standard on the third frequency; and
optionally continue receiving signals based on the TD-SCDMA standard on the second frequency during at least one TD-SCDMA time slot TS0.

21. The circuit of claim 17, wherein the controller controls the first and second frequency synthesizers and the signal processing circuit to:
perform reception of broadcast channel (BCH) signals for multimedia broadcast and multicast services (MBMS) on a first frequency during a TD-SCDMA time slot TS0 when the wireless communications based on the TD-SCDMA standard are rendered on a second frequency that is optionally the same as or different from the first frequency; and
suspend reception of signals based on the GSM standard on a third frequency during a period of time that is originally scheduled for receiving signals based on the GSM standard, the period of time at least partially coinciding with the TD-SCDMA time slot TS0 during which the BCH signals are received for MBMS, the third frequency being different from the first and second frequencies.

* * * * *